(12) United States Patent
Takemori et al.

(10) Patent No.: US 10,419,220 B2
(45) Date of Patent: Sep. 17, 2019

(54) MANAGEMENT DEVICE, KEY GENERATING DEVICE, VEHICLE, MAINTENANCE TOOL, MANAGEMENT SYSTEM, MANAGEMENT METHOD, AND COMPUTER PROGRAM

(71) Applicant: KDDI CORPORATION, Tokyo (JP)

(72) Inventors: Keisuke Takemori, Tokyo (JP); Hideaki Kawabata, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 71 days.

(21) Appl. No.: 15/533,751

(22) PCT Filed: Dec. 14, 2015

(86) PCT No.: PCT/JP2015/084909
§ 371 (c)(1),
(2) Date: Jun. 7, 2017

(87) PCT Pub. No.: WO2016/093368
PCT Pub. Date: Jun. 16, 2016

(65) Prior Publication Data
US 2017/0324558 A1    Nov. 9, 2017

(30) Foreign Application Priority Data

Dec. 12, 2014 (JP) ................................ 2014-252477
Nov. 27, 2015 (JP) ................................ 2015-232348

(51) Int. Cl.
*H04L 29/06* (2006.01)
*H04L 9/32* (2006.01)
(Continued)

(52) U.S. Cl.
CPC ............ *H04L 9/3226* (2013.01); *B60R 25/00* (2013.01); *G06F 21/445* (2013.01);
(Continued)

(58) Field of Classification Search
CPC ...... H04L 9/3226; B60R 25/00; G06F 21/445
(Continued)

(56) References Cited

U.S. PATENT DOCUMENTS

2005/0176407 A1* 8/2005 Tuomi ............. H04L 63/083
455/411
2006/0115085 A1  6/2006 Iwamura
(Continued)

FOREIGN PATENT DOCUMENTS

JP    2005-203882 A     7/2005
JP    2005-341528 A    12/2005
(Continued)

OTHER PUBLICATIONS

Office Action issued in Japanese family member Patent Appl. No. 2017-130661, dated Jun. 5, 2018, along with an English translation thereof.
(Continued)

*Primary Examiner* — Anthony D Brown
(74) *Attorney, Agent, or Firm* — Greenblum & Bernstein, P.L.C.

(57) ABSTRACT

An automobile is equipped with a management device including a communication part for communicating with an ECU mounted on an automobile, an encryption processor for generating an encrypted key by encrypting a key, a key generation part for generating the key, and a key storage unit for storing the key generated by the key generation part. The communication part transmits the encrypted key to the ECU, while the encryption processor encrypts the key generated by the key generation part.

10 Claims, 21 Drawing Sheets

(51) Int. Cl.
*H04L 9/08* (2006.01)
*H04L 9/14* (2006.01)
*H04W 12/04* (2009.01)
*B60R 25/00* (2013.01)
*G06F 21/44* (2013.01)
*G06F 21/57* (2013.01)

(52) U.S. Cl.
CPC .......... *G06F 21/575* (2013.01); *H04L 9/0822* (2013.01); *H04L 9/0861* (2013.01); *H04L 9/0891* (2013.01); *H04L 9/0894* (2013.01); *H04L 9/14* (2013.01); *H04L 9/3271* (2013.01); *H04W 12/04* (2013.01); *G06F 2221/2103* (2013.01); *H04L 2209/80* (2013.01); *H04L 2209/84* (2013.01)

(58) Field of Classification Search
USPC ....................................................... 713/171
See application file for complete search history.

(56) References Cited

U.S. PATENT DOCUMENTS

| | | | | |
|---|---|---|---|---|
| 2006/0255910 | A1* | 11/2006 | Fukushima | B60R 25/04 340/5.65 |
| 2011/0320089 | A1 | 12/2011 | Lewis | |
| 2013/0067220 | A1* | 3/2013 | Ando | H04L 9/3268 713/156 |
| 2013/0173112 | A1 | 7/2013 | Takahashi et al. | |
| 2013/0230173 | A1 | 9/2013 | Hori | |
| 2015/0086016 | A1 | 3/2015 | Oshida et al. | |
| 2016/0173530 | A1* | 6/2016 | Miyake | H04L 63/08 726/3 |

FOREIGN PATENT DOCUMENTS

| | | |
|---|---|---|
| JP | 2013-138304 A | 7/2013 |
| JP | 2013-138320 A | 7/2013 |
| JP | 2013-234521 A | 11/2013 |
| JP | 2014-053675 | 3/2014 |
| JP | 2015-65495 A | 4/2015 |
| JP | 2015-76018 A | 4/2015 |
| JP | 2016-116216 A | 6/2016 |

OTHER PUBLICATIONS

Search Report issued in European Patent Office (EPO) Patent Application No. 15867958.9, dated Jun. 11, 2018.
Takemori et al., "Protection for Automotive Control System Using Secure Boot and Authentication", IEICE Technical Report, Sep. 12, 2014, pp. 47-54, vol. 114, No. 225.
Miller et al., "Adventures in Automotive Networks and Control Units", DEF CON 21, Aug. 2013.
Takemori, "Secure Boot for Android+TPM", Nikkei Electronics, Aug. 6, 2012, together with a partial English-language translation.
Takada et al., "Suggestion for Intensifying Information Security for Vehicle-Embedded System", Sep. 2013, together with an English-language translation.
Takemori et al., "Secure Boot for Android(ARM)+TPM", the Institute of Electronics, Information and Communication Engineers, SCIS2013 Symposium, Jan. 2013, together with a partial English-language translation.
Takemori et al., "Secure Boot for ARM+SIM/UIM", the Institute of Electronics, Information and Communication Engineers, SCIS2014 Symposim, Jan. 2014, together with a partial English-language translation.
"Trusted Computing Group, Internet website URL: http://www.trustedcomputinggroup.org", printed on Mar. 22, 2017.
C. Schleiffer et al., "Secure Key Management—A Key Feature for Modern Vehicle Electronics", SAE Technical Paper, SAE International, Apr. 8, 2013, 2013-01-1418.
Search Report issued in International Bureau of WIPO Patent Application No. PCT/JP2015/084909, dated Mar. 15, 2016.
Office Action issued in Japan family member patent Appl. No. 2015-232348, dated Apr. 4, 2017, along with an English translation thereof.

* cited by examiner

MANAGEMENT DEVICE, KEY GENERATING DEVICE, VEHICLE, MAINTENANCE TOOL, MANAGEMENT SYSTEM, MANAGEMENT METHOD, AND COMPUTER PROGRAM

TECHNICAL FIELD

The present invention relates to a management device, a key generating device, a vehicle, a maintenance tool, a management system, a management method, and a computer program.

The present application claims the benefit of priority on Japanese Patent Application No. 2014-252477 filed on Dec. 12, 2014 and Japanese Patent Application No. 2015-232348 filed on Nov. 27, 2015, the subject matters of which are hereby incorporated herein by reference.

BACKGROUND ART

Recently, an ECU (Electronic Control Unit) is installed in each vehicle so as to achieve the function of controlling its engine under the ECU. The ECU is one type of computer that achieves predetermined functions according to computer programs. Normally, already-used vehicles have been updated in computer programs for each ECU at inspections or periodical inspections of vehicles in ordinal automobile repair shops.

Conventionally, a workman handling updating of computer programs for each ECU connects a maintenance-dedicated diagnostic terminal to a diagnostic port called a vehicle OBD (On-Board Diagnostics) port so as to install updating programs or change data settings with the diagnostic terminal. For example, Non-Patent Literatures 1 and 2 disclose securities for vehicles.

CITATION LIST

Non-Patent Literature Document

Non-Patent Literature 1: C. Millerr, C. Valasek, "Adventures in Automotive Networks and Control Units", DEF CON 21, August 2013

Non-Patent Literature 2: Hiroaki Takada, Tsutomu Matsumoto, "Suggestion for Intensifying Information Security for Vehicle-Embedded System", September 2013, Internet <URL: https://www.ipa.go.jp/files/000034668.pdf>

Non-Patent Literature 3: Trusted Computer Group, Internet <URL: http://www.trustedcomputinggroup.org/>

Non-Patent Literature 4: Keisuke Takemori, "Secure Boot for Android+TPM", Nikkei Electronics, Aug. 6, 2012

Non-Patent Literature 5: Keisuke Takemori, Hideaki Kawabata, Takamasa Isohara, Wataru Kubota, "Secure Boot for Android (ARM)+TPM", the Institute of Electronics, Information and Communication Engineers, SCIS2013 Symposium, January 2013

Non-Patent Literature 6: Keisuke Takemori, Hideaki Kawabata, Wataru Kubota, "Secure Boot for ARM+SIM/UIM", the Institute of Electronics, information and Communication Engineers, SCIS2014 Symposium, January 2014

SUMMARY OF INVENTION

Technical Problem

The aforementioned documents of Non-Patent Literatures 1 and 2 do not disclose any means for realizing improvements in securities. For this reason, it is required to improve reliability in data applications such as computer programs used for on-board computers such as ECUs installed in vehicles such as automobiles.

For example, it is possible to improve protective performance in a vehicle-mounted computer system by way of mutual authentication with any party to data exchange using a key held by an ECU after being started up. For example, it is possible to verify the correctness of data exchanged with each ECU by use of a key held by each ECU. For example, it is possible to inspect data such as computer programs used for each ECU such that data such as computer programs used for each ECU are added with an electronic signature and delivered to a vehicle management device, which in turn verifies the electronic signature added to the delivered data by use of a key held by the vehicle management device. Herein, a problem concerning security of keys can be realized as how to manage or update keys held by vehicles.

The present invention is made in consideration of the aforementioned circumstances, and therefore the present invention aims to provide a management device, a key generating device, a vehicle, a maintenance tool, a management system, and a computer program, thus realizing management or updating of keys held by vehicles such as automobiles.

Solution to Problem (1) A management device according to one aspect of the present invention is a management device installed in a vehicle, which includes a communication part configured to communicate with an on-board computer mounted on the vehicle; an encryption processor configured to encrypt a key and thereby generate an encrypted key; a key generation part configured to generate the key; and a key storage unit configured to store the key. The communication part transmits the encrypted key to the on-board computer mounted on the vehicle, while the encryption processor encrypts the key.

(2) The management device according to one aspect of the present invention may further include an initially-delivered key storage unit configured to store a plurality of initially-delivered keys corresponding to candidates of initially-delivered keys held by the on-board computer, and a verification part configured to verify encrypted data from the on-board computer mounted on the vehicle via the communication part by use of the initially-delivered key stored on the initially-delivered key storage unit. The encryption processor uses the initially-delivered key used for successful verification in order to encrypt the key.

(3) The management device according one aspect of the present invention may further include a fixed-value encryption list storing part configured to store a list describing combinations of encrypted fixed values, which are produced by encrypting fixed values using the initially-delivered keys stored on the initially-delivered key storage unit, and the initially-delivered keys used for encryption of the encrypted fixed values. The verification part compares the encrypted fixed value from the on-board computer via the communication part with each of the encrypted fixed values described on the list so as to use the initially-delivered key included in each combination having matched the encrypted fixed value among combinations on the list for verification of the encrypted data.

(4) In the management device according to one aspect of the present invention, the verification part may transmit a challenge to the on-board computer mounted on the vehicle, and therefore the encrypted data may be generated by encrypting the challenge by use of the initially-delivered key held by the on-board computer mounted on the vehicle.

(5) In the management device according to one aspect of the present invention, the key generation part may generate a first key and a second key serving as a management key, and therefore the encryption processor may encrypt the management key by use of the initially-delivered key identical to the initially-delivered key held by the on-board computer mounted on the vehicle among the initially-delivered keys stored on the initially-delivered key storage unit, thus encrypting the first key using the management key.

(6) In the management device according to one aspect of the present invention, the key generation part may repeatedly generate the management key, and wherefore the key storage unit may store the latest management key and its preceding management key preceding the latest management key among management keys, while the encryption processor may encrypt the latest management key by use of the preceding management key.

(7) The management device according to one aspect of the present invention may further include an initially-delivered key storage unit configured to store initially-delivered keys corresponding to candidates of initially-delivered keys held by the on-board computer. The encryption processor encrypts the initially-delivered key stored on the initially-delivered key storage unit, and therefore the communication part transmits an encrypted key, which is generated by encrypting the initially-delivered key, to the on-board computer having received a specific notification among the on-board computers mounted on the vehicle.

(8) In the management device according to one aspect of the present invention, the encryption processor may encrypt a predetermined abandonment key, and therefore the communication part may transmit an encrypted key, which is generated by encrypting the abandonment key, to the on-board computer having received an abandonment notification among the on-board computers mounted on the vehicle.

(9) In the management device according to one aspect of the present invention, the encryption processor may encrypt a challenge from the on-hoard computer mounted on the vehicle via the communication part by use of the initially-delivered key used for successful verification, and therefore the communication part may transmit an encrypted challenge, which is generated by encrypting the challenge, as a response to the on-board computer mounted on the vehicle.

(10) The management device according to one aspect of the present invention may further include a wireless communication part configured to communicate with a management server. The encryption processor encrypts the key stored on the key storage unit by use of a key shared with the management server, and therefore the wireless communication part transmits an encrypted key, which is generated by encrypting the key stored on the key storage unit by use of the key shared with the management server, to the management server.

(11) In the management device according to one aspect of the present invention, the encryption processor, the key generation part, and the key storage unit may be included in a secure element.

(12) In the management device according to one aspect of the present invention, the secure element may be an eSIM (Embedded Subscriber Identity Module) or an SIM (Subscriber Identity Module).

(13) A vehicle according to one aspect of the present invention includes the aforementioned management device.

(14) A management system according to one aspect of the present invention includes the aforementioned (10) management device and a management server configured to communicate with the management device through a wireless communication network. The management server receives an encrypted key from the management device while holding a key.

(15) A key generation device according to one aspect of the present invention includes a key storage unit configured to store a master key, wherein a key generated using the master key is supplied to an on-board computer mounted on a vehicle.

(16) In the key generation device according to one aspect of the present invention, the key supplied to the on-board computer may be generated using the master key and an identifier of the on-board computer.

(17) The key generation device according to one aspect of the present invention may be formed using a secure element included in a communication module installed in the vehicle.

(18) The key generation device according to one aspect of the present invention may be formed using a secure element included in a control module configured to receive or transmit data with the on-board computer via a diagnostic port of the vehicle.

(19) A vehicle according to one aspect of the present invention includes the aforementioned (17) key generation device.

(20) A maintenance tool according to one aspect of the present invention includes the aforementioned (18) key generation device.

(21) A management method according to one aspect of the present invention includes a communication step for allowing a management device installed in a vehicle to communicate with an on-board computer mounted on the vehicle; an encryption processing step for generating an encrypted key by encrypting a key with the management device; a key generating step for generating the key with the management device; and a key storing step for storing the key having being generated with the management device. The management device transmits the encrypted key to the on-board computer mounted on the vehicle, while the management device encrypts the key having being generated.

(22) One aspect of the present invention is directed to a management method including a key storing step for storing a master key with a key generation device, and a key supplying step for supplying a key, which is generated using the master key, to an on-board computer mounted on a vehicle.

(23) A computer program according to one aspect of the present invention is a computer program causing a computer mounted on a vehicle to implement a communication step for communicating with an on-board computer mounted on the vehicle; an encryption processing step for generating an encrypted key by encrypting a key; a key generating step for generating the key; and a key storing step for storing the key having been generated. The encrypted key is transmitted to the on-board computer mounted on the vehicle in the communication step, while the key having been generated is encrypted in the encryption processing step.

(24) A computer program according to one aspect of the present invention causes a computer mounted on a key generation device to implement a key storing step for storing a master key, and a key supplying step for supplying a key, which is generated using the master key, to an on-board computer mounted on a vehicle.

Advantageous Effects of Invention

According to the present invention, it is possible to achieve an effect of managing or updating keys held by vehicles such as automobiles.

DESCRIPTION OF EMBODIMENTS

Hereinafter, the present invention will be described by way of embodiments with reference to the drawings. In this connection, the following embodiments will be described with respect to an automobile as an example of a vehicle.

First Embodiment

Figure 1:
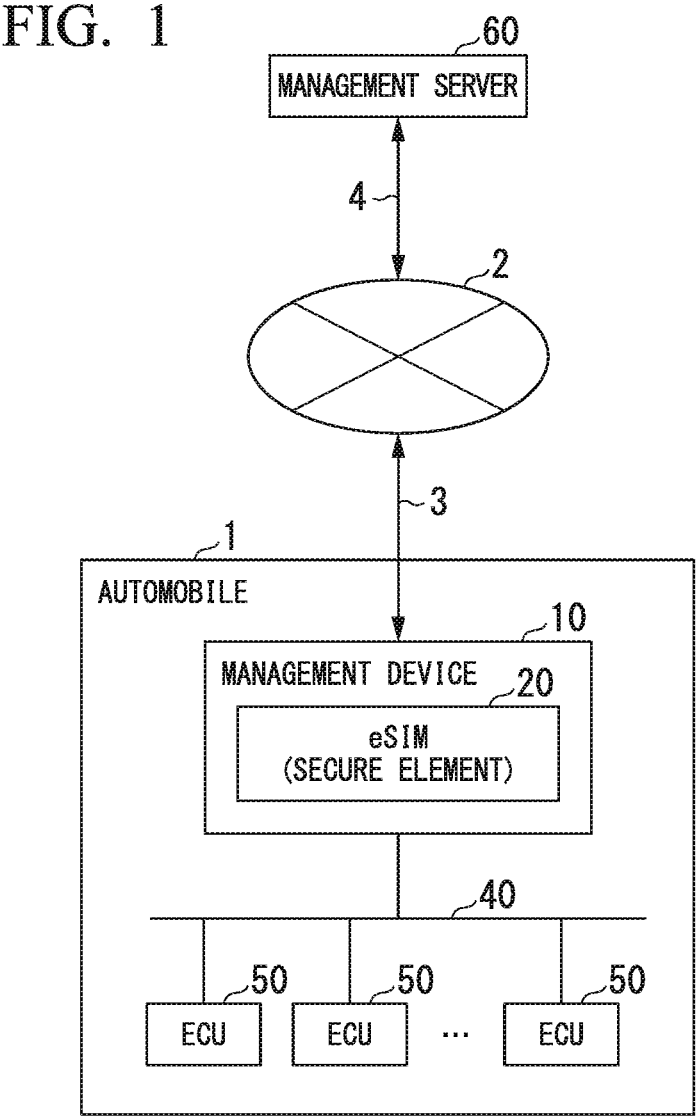
FIG. 1 is a configuration diagram of a management system according to the first embodiment.

FIG. 1 is a configuration diagram of a management system according to the first embodiment of the present invention. In FIG. 1, the management system includes a management device 10 and a management server 60. The management device 10 is installed in an automobile 1. The management server 60 is installed by a common carrier having a wireless communication network 2.

An eSIM (embedded Subscriber Identity Module) or an SIM (Subscriber Identity Module), which stores subscriber information about the wireless communication network 2, is needed to utilize the wireless communication network 2. The management device 10 is equipped with an eSIM_20. The eSIM_20 is an eSIM storing subscriber information about the wireless communication network 2. Therefore, it is possible for the management device 10 to utilize the wireless communication network 2 by use of the eSIM_20. The management device 10 is connected to the wireless communication network 2 through a wireless communication line 3 established with the eSIM_20.

The management server 60 is connected to the wireless communication network 2 through a wireless communication line 4 provided by a common carrier having the wireless communication network 2. The management device 10 communicates with the management server 60 through the wireless communication network 2.

In this connection, it is possible to establish a dedicated line passing through the wireless communication network 2 between the management device 10 and the management server 60 such that the management device 10 can transmit or receive data with the management server 60 through a dedicated line.

In the automobile 1, the management device 10 is connected to a controller on-board network 40. As the controller on-board network 40, for example, it is possible to use CAN (Controller Area Network). In the present embodiment, the controller on-board network 40 is CAN. Various types of ECUs 50 are connected to the controller on-board network 40. The ECU 50 is an on-board computer mounted on the automobile 1. As ECUs 50, for example, it is possible to mention a drive ECU, a body ECU, and a safety control ECU. The management device 10 exchanges data with each ECU 50 through the controller on-board network 40. One ECU 50 may exchange data with another ECU 50 through the controller on-board network 40.

Figure 2:
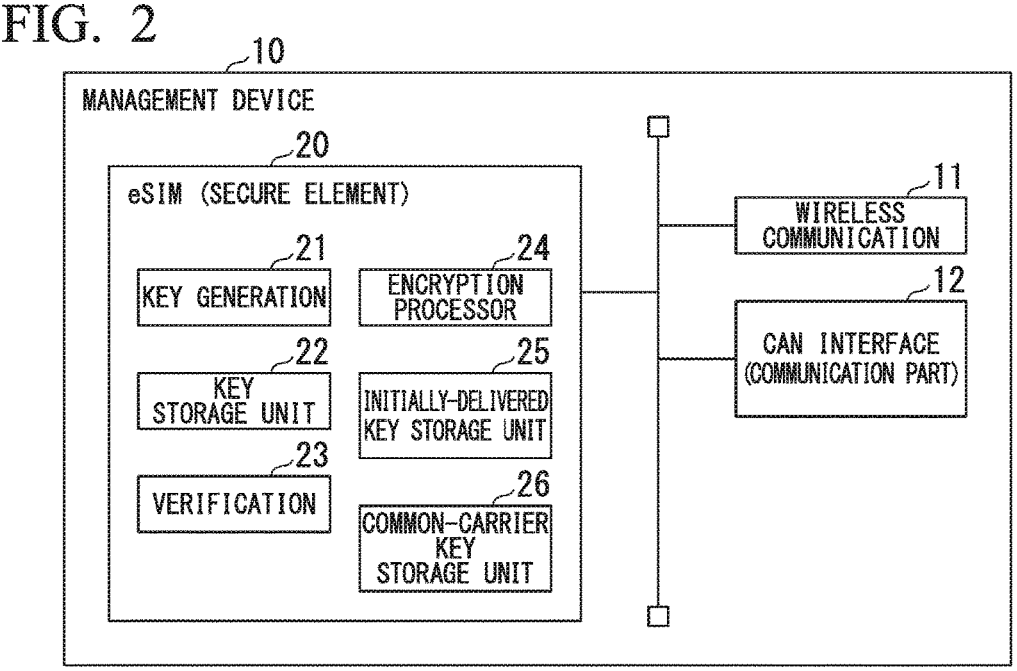
FIG. 2 is a configuration diagram of a management device 10 according to the first embodiment.

FIG. 2 is a configuration diagram of the management device 10 according to the first embodiment. In FIG. 2, the management device 10 includes an eSIM_20, a wireless communication part 11, and a CAN interface 12. These parts are configured to exchange data therewith. The eSIM_20 includes a key generation part 21, a key storage unit 22, a verification part 23, an encryption processor 24, a initially-delivered key storage unit 25, and a common-carrier key storage unit 26.

The eSIM_20 is a secure element. The secure element includes a secure area that cannot be accessed from the outside of the secure element. In the eSIM_20, the key storage unit 22, the initially-delivered key storage unit 25, and the common-carrier key storage unit 26 are arranged in the secure area.

As the secure element, it is possible to use an SIM instead of the eSIM_20. Both the eSIM and the SIM are one type of computer, and therefore they can achieve desired functions according to computer programs.

The wireless communication part 11 transmits or receives data via wireless communication. The eSIM_20 is an eSIM storing subscriber information about the wireless communication network 2. Therefore, the wireless communication part 11 using the eSIM_20 can be connected to the wireless communication network 2 through the wireless communication line 3. The CAN interface 12 is a communication part configured to communicate with the ECU 50. The CAN interface 12 is connected to the controller on-board network 40 so as to exchange data with each ECU 50 through the controller on-board network 40.

In the eSIM_20, the key generation part 21 generates keys. The key storage unit 22 stores keys. The verification part 23 verifies data exchange. The encryption processor 24 encrypts data or decrypts encrypted data. The initially-delivered key storage unit 25 stores an initially-delivered key. The common-carrier key storage unit 26 stores a common-carrier key.

As keys generated by the key generation part 21, the present embodiment employs types of keys, i.e. an ECU-management key and an ECU key. For example, the ECU-management key is used to update keys, such as an ECU key, with the ECU 50. For example, the ECU key is used for mutual authentication, encryption or decryption of data between the ECUs 50.

The key generation part 21 generates an ECU-management key and an ECU key at predetermined timings. Herein, the timing of generating an ECU-management key may be identical to or different from the timing of generating an ECU key. In response to a key generation request from the outside of the eSIM_20, the key generation part 21 may generate one of or both of the ECU-management key and the ECU key. The key generation part 21 may repeatedly generate the ECU-management key and the ECU key.

Figure 3:
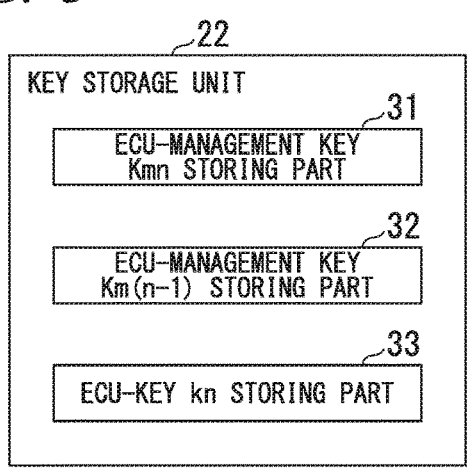
FIG. 3 is a configuration diagram of a key storage unit 22 according to the first embodiment.

The key storage unit 22 stores the ECU-management key and the ECU key generated by the key generation part 21. FIG. 3 is a configuration diagram of the key storage unit 22 according to the first embodiment. In FIG. 3, the key storage unit 22 includes an ECU-management key Kmn storing part 31, an ECU-management key Km(n−1) storing part 32, and an ECU-key kn storing part 33.

The ECU-management key Kmn storing part 31 stores the latest ECU-management key Kmn among ECU-management keys generated by the key generation part 21. The ECU-management key Km(n−1) storing part 32 stores an ECU-management key Km(n−1) that precedes the latest ECU-management key Kmn among ECU-management keys generated by the key generation part 21. The ECU-key kn storing part 33 stores the latest ECU key kn among ECU keys generated by the key generation part 21.

Figure 4:
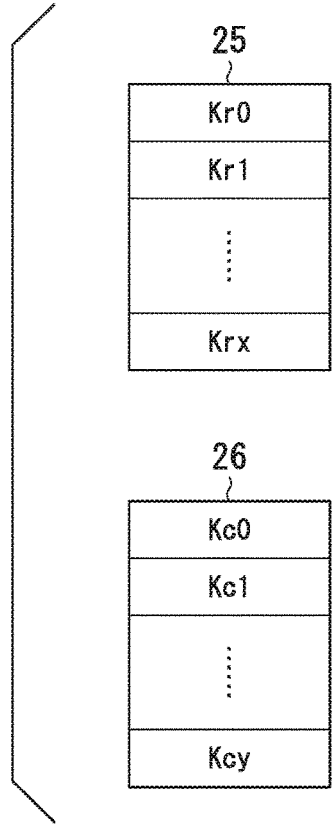
FIG. 4 shows configurations of an initially-delivered key storage unit 25 and a common-carrier key storage unit 26 according to the first embodiment.

FIG. 4 shows configurations of the initially-delivered key storage unit 25 and the common-carrier key storage unit 26 according to the first embodiment.

In FIG. 4, the initially-delivered key storage unit 25 stores x initially-delivered keys Kr0, Kr1, . . . , Krx. Herein, x is an integer equal to or larger than one. The initially-delivered keys Kr0, Kr1, . . . , Krx are candidates of initially-delivered keys to be held by the ECUs 50. At the manufacture or delivery of the ECUs 50 or after the ECUs 50 are mounted on the automobile 1, initially-delivered keys are written into the ECUs 50. Normally, a plurality of initially-delivered keys are generated. An initially-delivered key selected from among a plurality of initially-delivered keys is written into each ECU 50. The initially-delivered keys Kr0, Kr1, . . . , Krx are candidates of initially-delivered keys written into the ECUs 50.

The following descriptions refer to Example 1, Example 2, and Example 3 of the issuance of initially-delivered keys.

Example 1 of Issuance of Initially-Delivered Keys

The common carrier providing the wireless communication network 2 issues the initially-delivered keys Kr0, Kr1, . . . , Krx. The initially-delivered keys Kr0, Kr1, . . . , Krx are delivered to the manufacturer of the ECU 50 and the manufacturer of the automobile 1. The common carrier of the wireless communication network 2 writes the initially-delivered keys Kr0, Kr1, . . . , Krx into the eSIM_20. The eSIM_20 stores the initially-delivered keys Kr0, Kr1, . . . , Krx on the initially-delivered key storage unit 25. The manufacturer of the ECUs 50 or the manufacturer of the automobile 1 writes an initially-delivered key, selected from among the initially-delivered keys Kr0, Kr1, . . . , Krx, into the ECU 50. The ECU 50 holds the initially-delivered key written therein.

Example 2 of Issuance of Initially-Delivered Keys

The manufacturer of the automobile 1 issues the initially-delivered keys Kr0, Kr1, . . . , Krx. The initially-delivered keys Kr0, Kr1, . . . , Krx are delivered to the common carrier of the wireless communication network 2. The common carrier of the wireless communication network 2 writes the initially-delivered keys Kr0, Kr1, . . . , Krx into the eSIM_20. The eSIM_20 stores the initially-delivered keys Kr0, Kr . . . , Krx on the initially-delivered key storage unit 25. The manufacturer of the automobile 1 writes an initially-delivered key, selected from among the initially-delivered keys Kr0, Kr1, . . . , Krx, into the ECU 50. The ECU 50 holds the initially-delivered key written therein. Alternatively, the initially-delivered keys Kr0, Kr1, . . . , Krx are delivered to the manufacturer of the ECUs 50. The manufacturer of the ECUs 50 writes an initially-delivered key, selected from among the initially-delivered keys Kr0, Kr1, . . . , Krx, into the ECU 50. The ECU 50 holds the initially-delivered key written therein.

Example 3 of Issuance of Initially-Delivered Keys

The manufacturer of the ECUs 50 issues the initially-delivered keys Kr0, Kr1, . . . , Krx. The initially-delivered keys Kr0, Kr1, . . . , Krx are delivered to the common carrier of the wireless communication network 2. The common carrier of the wireless communication network 2 writes the initially-delivered keys Kr0, Kr1, . . . , Krx into the eSIM_20. The eSIM_20 stores the initially-delivered keys Kr0, Kr . . . , Krx on the initially-delivered key storage unit 25. The manufacturer of the ECUs 50 writes an initially-delivered key, selected from among the initially-delivered keys Kr0, Kr1, . . . , Krx, into the ECU 50. The ECU 50 holds the initially-delivered key written therein. Alternatively, the initially-delivered keys Kr0, Kr1, . . . , Krx are delivered to the manufacturer of the automobile 1. The manufacturer of the automobile 1 writes an initially-delivered key, selected from among the initially-delivered keys Kr0, Kr1, . . . , Krx, into the ECU 50. The ECU 50 holds the initially-delivered key written therein.

To prevent the leakage of the initially-delivered keys Kr0, Kr1, . . . , Krx, it is preferable for the common carrier of the wireless communication network 2, the manufacturer of the ECUs 50, and the manufacturer of the automobile 1 to carefully handle the initially-delivered keys Kr0, Kr1, . . . , Krx.

In FIG. 4, the common-carrier key storage unit 26 stores y common-carrier keys Kc0, Kc1, . . . , Kcy. Herein, y is an integer equal to or larger than one. The common-carrier keys Kc0, Kc1, . . . , Kcy are candidates of common-carrier keys for the eSIM_20 to use the wireless communication network 2. At the manufacture or delivery of the eSIM_20 or after the eSIM_20 is installed in the management device 10, the common-carrier keys Kc0, Kc1, . . . , Kcy are written into the eSIM_20. The eSIM_20 stores the common-carrier keys Kc0, Kc1, . . . , Kcy on the common-carrier key storage unit 26. In addition, a common-carrier key is selected from among the common-carrier keys Kc0, Kc1, . . . , Kcy and set to the eSIM_20. The eSIM_20 selects a common-carrier key from among the common-carrier keys Kc0, Kc1, . . . , Kcy according to default settings so as to use the selected common-carrier key. The common carrier of the wireless communication network 2 records the information specifying the common-carrier key used by the eSIM_20.

Figure 5:
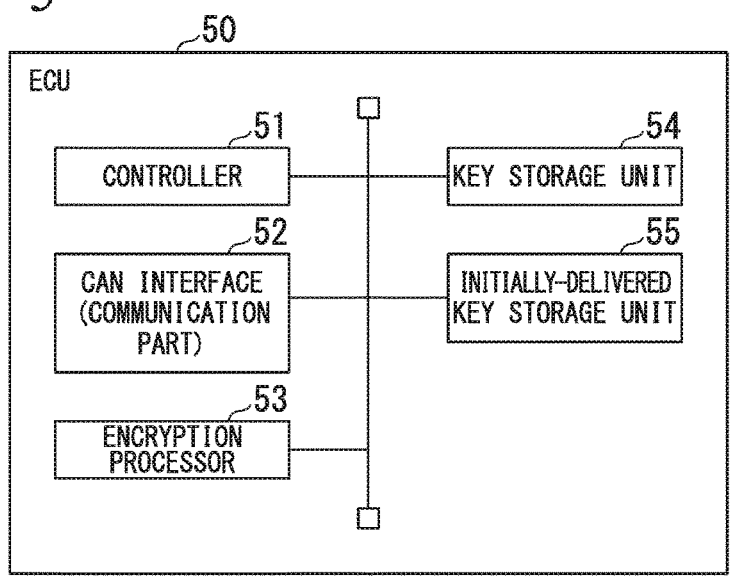
FIG. 5 is a configuration diagram of an ECU 50 according to the first embodiment.

FIG. 5 is a configuration diagram of the ECU 50 according to the first embodiment. In FIG. 5, the ECU 50 includes a controller 51, a CAN interface 52, an encryption processor 53, a key storage unit 54, and an initially-delivered key storage unit 55. These parts are configured to exchange data therewith.

The controller 51 has a predetermined control function. The CAN interface 52 is a communication part configured to communicate with the management device 10 and another ECU 50. The CAN interface 52 is connected to the controller on-board network 40 so as to exchange data with the management device 10 and another ECU 50 through the controller on-board network 40.

The encryption processor 53 encrypts data and decrypts the encrypted data. The key storage unit 54 stores keys. As keys stored on the key storage unit 54, the present embodiment provides two types of keys, i.e. an ECU-management key and an ECU key. The initially-delivered key storage unit 55 stores initially-delivered keys.

Figure 6:
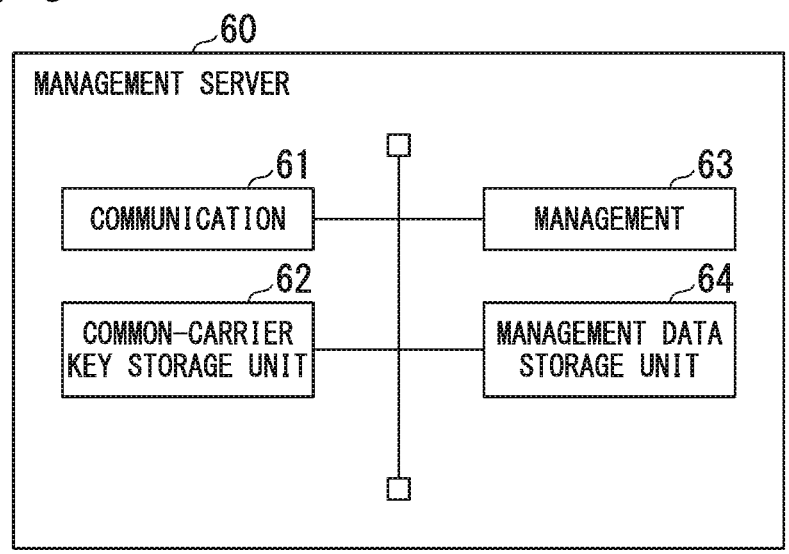
FIG. 6 is a configuration diagram of a management server 60 according to the first embodiment.

FIG. 6 is a configuration diagram of the management server 60 according to the first embodiment. In FIG. 6, the management server 60 includes a communication part 61, a common-carrier key storage unit 62, a management part 63, and a management data storage unit 64. These parts are configured to exchange data therewith. The communication part 61 transmits or receives data through the communication line 4. The communication part 61 is connected to the wireless communication network 2 through the communication line 4. The common-carrier key storage unit 62 stores common-carrier keys. The management part 63 carries out management on the automobile 1. The management data storage unit 64 stores management data concerning the automobile 1.

Next, a management method according to the first embodiment will be described. The following descriptions are made with respect to the situation that the management device 10 transmits or receives data with the ECU 50 through the controller on-board network 40. The eSIM_20 of the management device 10 transmits or receives data with the ECU 50 through the CAN interface 12. Various parts of the ECU 50 transmits or receives data with the eSIM_20 of the management device 10 through the CAN interface 52.

Example A1 of ECU-Management Key Updating Method

Figure 7:
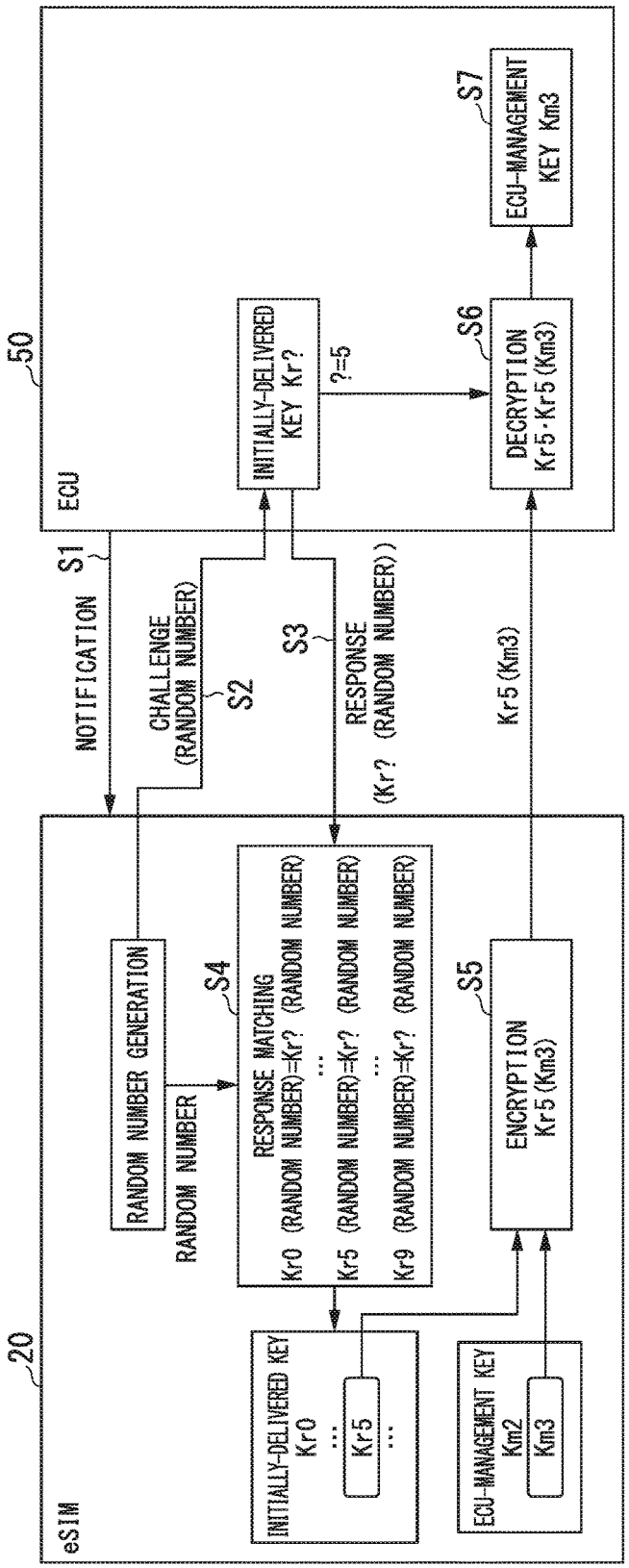
FIG. 7 is a sequence chart showing Example A1 of an ECU-management key updating method as a management method of the first embodiment.

FIG. 7 is a sequence chart showing Example A1 of an ECU-management key updating method according to the first embodiment. Herein, Example A1 of the ECU-management key updating method is an updating method for updating ECU-management keys with the ECUs 50 mounted on the automobile 1. As applications relating to Example A1 of the ECU-management key updating method, it is possible to mention Applications 1 and 2 of ECU-management key updating methods described below.

(Application 1 of ECU-Management Key Updating Method)

Example A1 of the ECU-management key updating method is applied to the new-model stage of the automobile 1 in order to update ECU-management keys with the ECUs 50 mounted on the automobile 1. As the new-model stage of the automobile 1, for example, it is possible to mention the manufacturing process of the automobile 1 and the process before selling of the automobile 1 after the completion of the manufacture thereof.

(Application 2 of ECU-Management Key Updating Method)

Example A1 of the ECU-management key updating method is applied to the replacement stage of the ECUs 50 in the automobile 1 in order to update ECU-management keys with the ECUs 50. As the replacement stage of the ECUs 50 in the automobile 1, for example, it is possible to mention the situation of replacing the failed ECU 50 with a normal ECU and the situation of replacing the ECU 50 with the latest ECU.

FIG. 7 shows a procedure for interaction between the eSIM_20 of the management device 10 and the ECU 50 in the automobile 1. In the eSIM_20, the ECU-management key Kmn storing part 31 of the key storage unit 22 stores a latest ECU-management key Km3 among ECU-management keys generated by the key generation part 21. The ECU-management key Km(n−1) storing part 32 of the key storage unit 22 stores an ECU-management key Km2 that precedes the latest ECU-management key Km3 among ECU-management keys generated by the key generation part 21.

In the ECU 50, the initially-delivered key storage unit 55 stores an initially-delivered key Kr? thereon. The eSIM_20 does not recognize the initially-delivered key Kr? held by the ECU 50. Hereinafter, Example A1 of the ECU-management key updating method will be described with reference to FIG. 7.

(Step S1)

The controller 51 of the ECU 50 transmits a mounting notification message, notifying the mounting of the ECU 50 on the automobile 1, to the eSIM_20. The eSIM_20 receives the mounting notification message transmitted by the ECU 50.

(Step S2)

The verification part 23 of the eSIM_20 generates a random number as a challenge. The eSIM_20 transmits the challenge (i.e. the random number) to the ECU 50 as a transmitting source of the mounting notification message.

(Step S3)

The encryption processor 53 of the ECU 50 generates encrypted data Kr? (i.e. a random number), which is produced by encrypting the challenge (i.e. the random number) from the eSIM_20 with the initially-delivered key Kr? stored on the initially-delivered key storage unit 55. The ECU 50 transmits the encrypted data Kr? (i.e. the random number) as a response to the eSIM_20.

(Step S4)

The verification part 23 of the eSIM_20 carries out a response matching process for the response Kr? (i.e. the random number) from the ECU 50. In the response matching process, the verification part 23 verifies the response Kr? (i.e. the random number) by use of the initially-delivered keys Kr0, Kr1, . . . , Krx stored on the initially-delivered key storage unit 25. As the verification method of the response Kr? (i.e. the random number), it is possible to mention Examples 1 and 2 of verification methods described below.

Example 1 of Verification Method

The verification part 23 encrypts the challenge (i.e. the random number) with each of the initially-delivered keys Kr0, Kr1, . . . , Krx so as to determined whether the encryption result matches the response Kr? (i.e. the random number). The verification part 23 may succeed in verifying the response Kr? (i.e. the random number) when the determination result indicates a single encryption result matches the response Kr? (i.e. the random number).

On the other hand, the verification part 23 may fail to verify the response Kr? (i.e. the random number) when the determination result indicates that none of encryption results matches the response Kr? (i.e. the random number) and when the determination result indicates that multiple encryption results match the response Kr? (i.e. the random number).

Example 2 of Verification Method

The verification part 23 decrypts the response Kr? (i.e. the random number) with each of the initially-delivered keys Kr0, Kr1, . . . , Krx stored on the initially-delivered key storage unit 25 so as to determine whether the decryption result matches the response (i.e. the random number). The verification part 23 may succeed in verifying the response Kr? (i.e. the random number) when the determination result indicates that a single decryption result matches the response (i.e. the random number). On the other hand, the verification part 23 may fail to verify the response Kr? (i.e. the random number) when the determination result indicates that none of decryption results matches the challenge (i.e. the random number) and when the determination result indicates that multiple decryption results match the challenge (i.e. the random number).

Upon successfully verifying the response Kr? (i.e. the random number), the eSIM_20 proceeds to step S5. Due to failure to verify the response Kr? (i.e. the random number), the eSIM_20 exits the procedure of FIG. 7. In this connection, it is possible to carry out a predetermined error process due to failure to verify the response Kr? (i.e. the random number).

(Step S5)

By use of the initially-delivered key that is used to successfully verify the response Kr? (i.e. the random number) in step S4, the encryption processor 24 of the eSIM_20 encrypts the ECU-management key Km3 stored on the ECU-management key Kmn storing part 31 of the key storage unit 22 and thereby generate an encrypted ECU-management key. In the case of FIG. 7, Kr5 is used as the initially-delivered key Kr? held by the ECU 50. That is, the initially-delivered key Kr5 is used to successfully verify the response Kr? (i.e. the random number) in step S4. In the case of FIG. 7, the encryption processor 24 generates an encrypted ECU-management key Kr5(Km3) by encrypting the ECU-management key K3 with the initially-delivered key Kr5. The eSIM_20 transmits the encrypted. ECU-management key Kr5(Km3) to the ECU 50 as a transmitting source of the response Kr? (i.e. the random number).

(Step S6)

The encryption processor 53 of the ECU 50 decrypts the encrypted ECU-management key Kr5(Km3) from the eSIM_20 with the initially-delivered key Kr5 stored on the initially-delivered key storage unit 55. The decryption result yield the ECU-management key Km3.

(Step S7)

The key storage unit 54 of the ECU 50 stores the ECU-management key Km3 as the decryption result of the encryption processor 53. Thus, the ECU-management key stored on the key storage unit 54 of the ECU 50 is updated with the latest ECU-management key Km3.

According to Example A1 of the ECU-management key updating method described above, it is possible to update the ECU-management key held by the ECU 50 with the latest ECU-management key generated by the automobile 1 installing the ECU 50 therein. Thus, it is possible to adjust the ECU-management key held by each ECU 50 mounted on the automobile 1 to the latest ECU-management key.

The ECU-management key is encrypted using the initially-delivered key shared by the eSIM_20 and the ECU 50 and then transmitted to the eSIM_20 and the ECU 50. Thus, it is possible to improve security in updating ECU-management keys.

Example A2 of ECU-Management Key Updating Method

Figure 8:
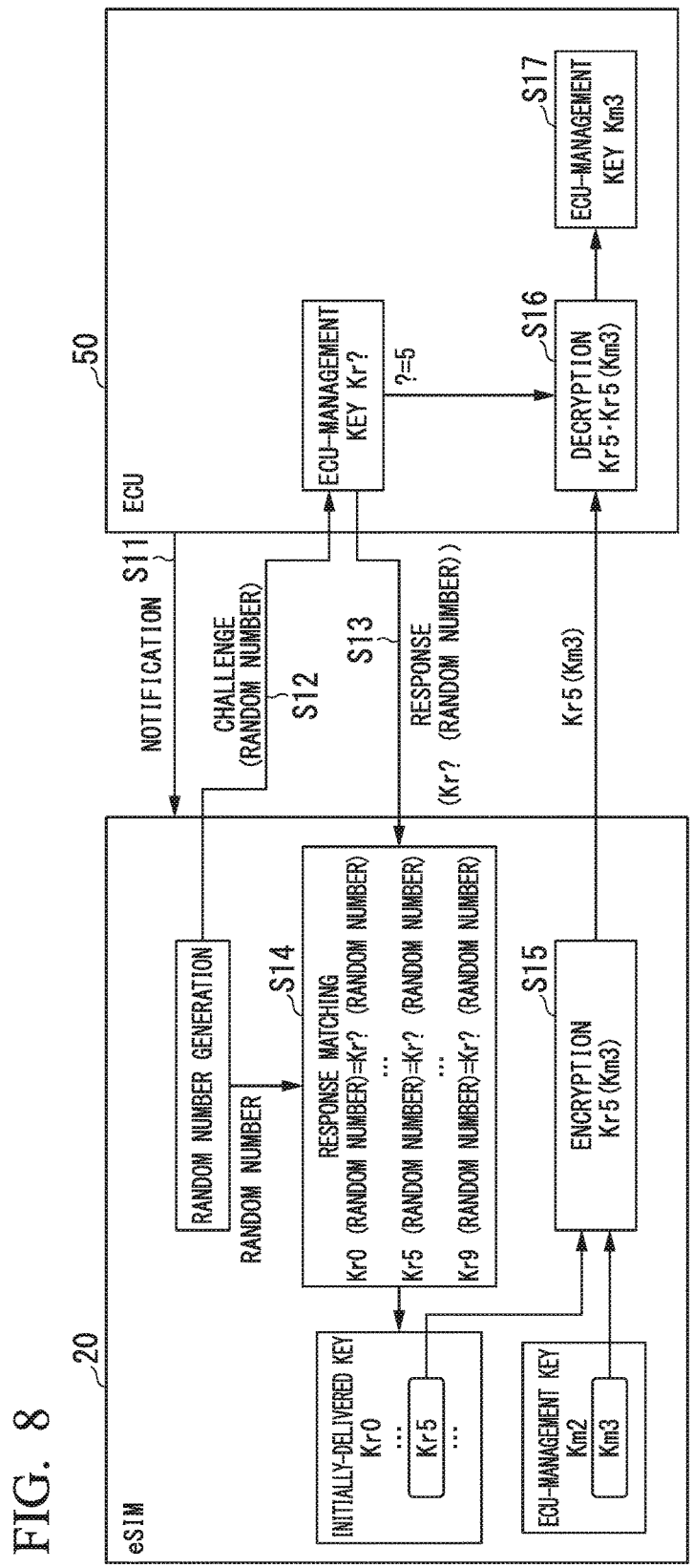
FIG. 8 is a sequence chart showing Example A2 of an ECU-management key updating method according to the first embodiment.

FIG. 8 is a sequence chart showing Example A2 of the ECU-management key updating method according to the first embodiment. Herein, Example A2 of the ECU-management key updating method is an updating method for updating ECU-management keys with the ECUs 50 mounted on the automobile 1. As applications for Example A2 of the ECU-management key updating method, it is possible to mention Applications 1 and 2 of ECU-management key updating methods described above.

FIG. 8 show a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21. The ECU-management key km(n−1) storing part 32 o the key storage unit 22 stores the ECU-management key Km2 that precedes the latest ECU-management key Km3 among ECU-management keys generated by the key generation part 21.

In the ECU 50, the key storage unit 54 stores the initially-delivered key Kr? as an ECU-management key. For example, it is possible to assume the situation that the initially-delivered key Kr? is written into the ECU 50 as an initial value of its ECU-management key. The eSIM_20 does not recognize the initially-delivered key Kr? held by the ECU 50. In this connection, the ECU 50 does not necessarily provide the initially-delivered key storage unit 55 according to Example A2 of the ECU-management key updating method. Hereinafter, Example A2 of the ECU-management key updating method will be described with reference to FIG. 8.

(Step S11)

The controller 51 of the ECU 50 transmits a mounting notification message, notifying the mounting of the ECU 50 on the automobile 1, to the eSIM_20. The eSIM_20 receives the mounting notification message from the ECU 50.

(Step S12)

The verification part 23 of the eSIM_20 generates a random number as a challenge. The eSIM_20 transmits the challenge (i.e. the random number) to the ECU 50 as a transmitting source of the mounting notification message.

(Step S13)

The encryption processor 53 of the ECU 50 encrypts the challenge (i.e. the random number) from the eSIM_20 with the ECU-management key stored on the key storage unit 54 (i.e. the ECU-management key corresponding to the initially-delivered key Kr?) and thereby generate encrypted data Kr? (i.e. a random number). The ECU 50 transmits the encrypted data Kr? (i.e. the random number) as a response to the eSIM_20.

(Step S14)

The verification part 23 of the eSIM_20 carries out a response matching process for the response Kr? (i.e. the random number) from the ECU 50. In the response matching process, the verification part 23 verifies the response Kr? (i.e. the random number) by use of the initially-delivered keys Kr0, Kr1, . . . , Krx stored on the initially-delivered key storage unit 25. As the verification method of the response Kr? (i.e. the random number), it is possible to mention Examples 1 and 2 of verification methods described above.

Upon successfully verifying the response Kr? (i.e. the random number), the eSIM_20 proceeds to step S15. Due to failure to verify the response Kr? (i.e. the random number), the eSIM_20 exits the procedure of FIG. 8. In this connection, it is possible to carry out a predetermined error process due to failure to verify the response Kr? (i.e. the random number).

(Step S15)

The encryption processor 24 of the eSIM_20 encrypts the ECU-management key Km3 stored on the ECU-management key Kmn storing part 31 of the key storage unit 22 by use of the initially-delivered key that is used to successfully verify the response Kr? (i.e. the random number) in step S14, thus generating an encrypted ECU-management key. In the case of FIG. 8, the initially-delivered key Kr5 is used as the ECU-management key used for encryption when the ECU 50 generates the response Kr? (i.e. the random number).

Therefore, the initially-delivered key Kr5 is used to successfully verify the response Kr? (i.e. the random number) in step S14. In the case of FIG. 8, the encryption processor 24 generates an encrypted ECU-management key Kr5(Km3) by encrypting the ECU-management key Km3 with the initially-delivered key Kr5. The eSIM_20 transmits the encrypted. ECU-management key Kr5(Km3) to the ECU 50 as a transmitting source of the response Kr? (i.e. the random number).

(Step S16)

The encryption processor 53 of the ECU 50 decrypts the encrypted ECU-management key Kr5(Km3) from the eSIM_20 by use of the ECU-management key stored on the key storage unit 54 (i.e. the ECU-management key corresponding to the initially-delivered key Kr5). The decryption result yield the ECU-management key Km3.

(Step S17)

The key storage unit 54 of the ECU 50 stores the ECU-management key Km3, i.e. the decryption result of the encryption processor 53, thereon. Thus, it is possible to update the ECU-management key stored on the storage unit 54 of the ECU 50 with the latest ECU-management key Km3.

According to Example A2 of the ECU-management key updating method described above, it is possible to update the ECU-management key held by the ECU 50 with the latest ECU-management key generated by the ECU 50 mounted on the automobile 1. Thus, it is possible to adjust the ECU-management key held by each ECU 50 to the latest ECU-management key.

In addition, the ECU-management key is encrypted using the initially-delivered key shared by the eSIM_20 and the ECU 50, and therefore the encrypted ECU-management key is transmitted from the eSIM_20 to the ECU 50. Thus, it is possible to improve security in updating ECU-management keys.

Example B1 of ECU-Key Updating Method

Figure 9:
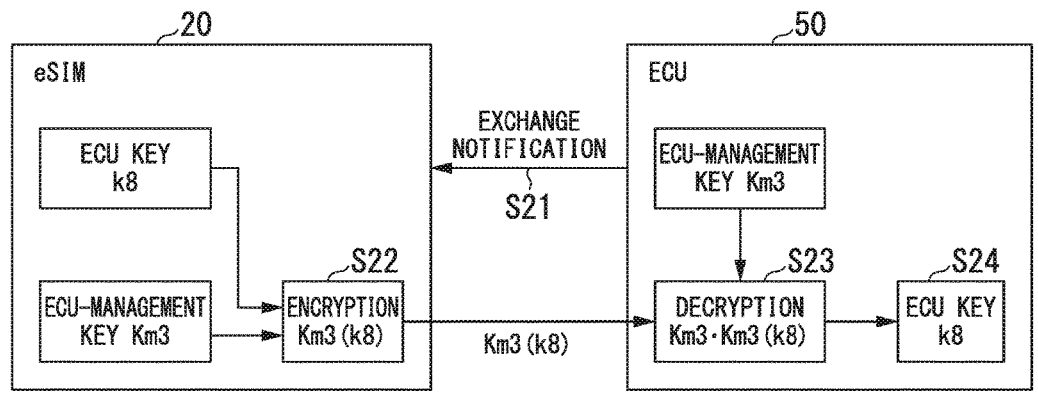
FIG. 9 is a sequence chart showing Example B1 of an ECU-key updating method according to the first embodiment.

FIG. 9 is a sequence chart showing Example B1 of the ECU-key updating method according to the first embodiment. Herein, Example B1 of the ECU-key updating method is an updating method for updating an ECU key with the ECU 50 mounted on the automobile 1. As applications for Example B1 of the ECU-key updating method, it is possible to mention Applications 1 and 2 of ECU-management key updating methods described above.

FIG. 9 shows a procedure for interaction between the eSIM_20 of the management device 10 and the ECU 50. In the eSIM_20, the ECU-management key Kmn storing part 31 of the key storage unit 22 stores the latest ECU-management key Km among ECU-management keys generated by the key generation part 21. The ECU-key kn storing part 33 of the key storage unit 22 stores the latest ECU key k8 among ECU keys generated by the key generation part 21.

In the ECU 50, the key storage unit 54 stores the ECU-management key Km3. Hereinafter, Example B1 of the ECU-key updating method will be described with reference to FIG. 9.

(Step S21)

The controller 51 of the ECU 50 transmits a mounting notification message, notifying the mounting of the ECU 50 on the automobile 1, to the eSIM_20. The eSIM_20 receives the mounting notification message from the ECU 50.

(Step S22)

The encryption processor 24 of the eSIM_20 encrypts the ECU key k8 stored on the ECU-key kn storing part 33 of the key storage unit 22 by use of the ECU-management key Km3 stored on the ECU-management key Kmn storing part 31 of the key storage unit 22, thus generating an encrypted ECU key Km3(k8). The eSIM_20 transmits the encrypted ECU key Km3(k8) to the ECU 50 as a transmitting source of the mounting notification message.

(Step S23)

The encryption processor 53 of the ECU 50 decrypts the encrypted ECU key Km3(k8) from the eSIM_20 by use of the ECU-management key Km3 stored on the key storage unit 54. The decryption result yields the ECU key k8.

(Step S24)

The key storage unit 54 of the ECU 50 stores the ECU key k8, i.e. the decryption result of the encryption processor 53, thereon. Thus, it is possible to update the ECU key stored on the key storage unit 54 of the ECU 50 with the latest ECU key k8.

According to Example B1 of the ECU-key updating method described above, it is possible to update the ECU key held by the ECU 50 with the latest ECU key generated by the ECU 50 mounted on the automobile 1.

Thus, it is possible to adjust the ECU key held by each ECU 50 mounted on the automobile 1 to the latest ECU key.

In addition, the ECU key is encrypted using the ECU-management key shared by the eSIM_20 and the ECU 50, and therefore the encrypted ECU key is transmitted from the eSIM_20 to the ECU 50. Thus, it is possible to improve security in updating ECU keys.

Example A3 of ECU-Management Key Updating Method

Figure 10:
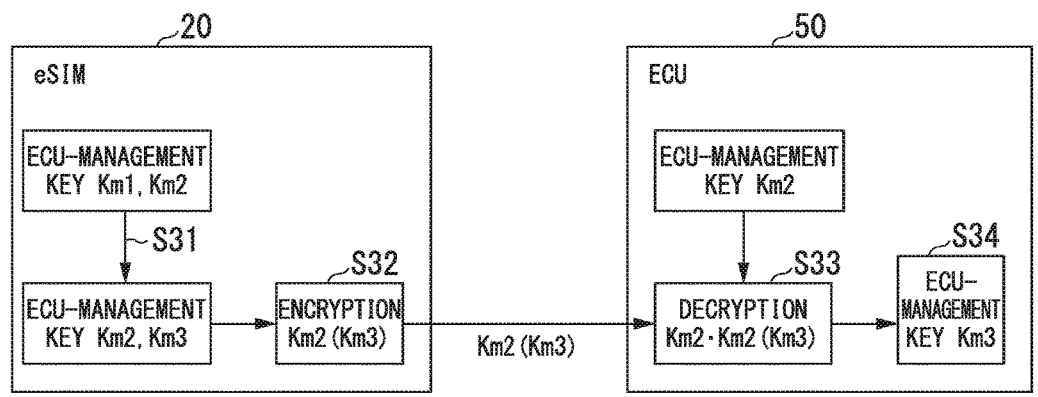
FIG. 10 is a sequence chart showing Example A3 of an ECU-management key updating method according to the first embodiment.

FIG. 10 is a sequence chart showing Example A3 of the ECU-management key updating method according to the first embodiment. Herein, Example A3 of the ECU-management key updating method is an updating method for updating an ECU-management key with the ECU 50 mounted on the automobile 1. According to Example A3 of the ECU-management key updating method, the eSIM_20 generates a new ECU-management key so as to update ECU-management key with the ECU 50.

FIG. 10 shows a procedure for interaction between the eSIM_20 of the management device 10 and the CU 50 in the automobile 1. In the eSIM_20, the ECU-management key Kmn storing part 31 of the key storage unit 22 stores the latest ECU-management key Km2 among ECU-management keys generated by the key generation part 21. The ECU-management key Km(n−1) storing part 32 of the key storage unit 22 stores the ECU-management key Km1 that precedes the latest ECU-management key Km2 among ECU-management keys generated by the key generation part 21.

In the ECU 50, the key storage unit 54 stores the ECU-management key Km2. Hereinafter, Example A3 of the ECU-management key updating method will be described with reference to FIG. 10.

(Step S31)

The key generation part 21 of the eSIM_20 generates a new ECU-management key Km3. The ECU-management key Km(n−1) storing part 32 of the key storage unit 22 stores the ECU-management key Km2, which is stored on the ECU-management key Kmn storing part 31, instead of the ECU-management key Km1 that is stored in advance. The ECU-management key Kmn storing part 31 of the key storage unit 22 stores the new ECU-management key Km3, which is generated by the key generation part 21, instead of the ECU-management key Km2 that is stored in advance. In the key storage unit 22, the ECU-management key Kmn storing part 31 stores the ECU-management key Km3 while the ECU-management key Km(n−1) storing part 32 stores the ECU-management key Km2.

(Step S32)

The encryption processor 24 of the eSIM_20 encrypts the ECU-management key Km3 stored on the ECU-management key Kmn storing part 31 of the key storage unit 22 by use of the ECU-management key Km2 stored on the ECU-management key Km(n−1) storing part 32 of the key storage unit 22, thus generating an encrypted. ECU-management key Km2(Km3). The eSIM_20 transmits the encrypted ECU-management key Km2(Km3) to the ECU 50.

(Step S33)

The encryption processor 53 of the ECU 50 decrypts the encrypted ECU-management key Km3(Km3) from the eSIM_20 by use of the ECU-management key Km2 stored on the key storage unit 54. The decryption result yields the ECU-management key Km3.

(Step S34)

The key storage unit 54 of the ECU 50 stores the ECU-management key Km3, i.e. the decryption result of the encryption processor 53, thereon. Thus, it is possible to update the ECU-management key stored on the key storage unit 54 of the ECU 50 with the latest ECU-management key Km3.

According to Example A3 of the ECU-management key updating method described above, it is possible to update the ECU-management key held by the ECU 50 with the latest ECU-management key generated by the ECU 50 mounted on the automobile 1. Thus, it is possible to adjust the ECU-management key held by each ECU 50 mounted on the automobile 1 to the latest ECU-management key.

In addition, the ECU-management key after encryption is encrypted using the ECU-management key before encryption, which is shared by the eSIM_20 and the ECU 50, and therefore the encrypted ECU-management key is transmitted from the eSIM_20 to the ECU 50. Thus, it is possible to improve security in updating the ECU-management key.

Example B2 of ECU-Key Updating Method

Figure 11:
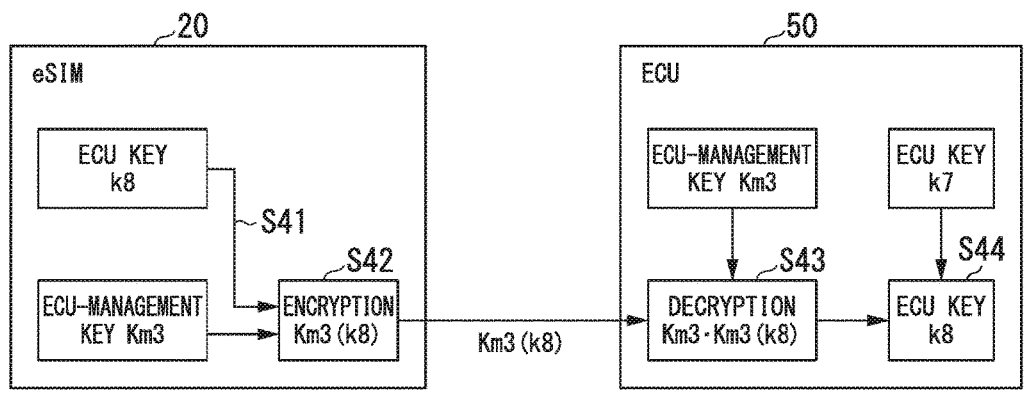
FIG. 11 is a sequence chart showing Example B2 of an ECU-key updating method according to the first embodiment.

FIG. 11 is a sequence chart showing Example B2 of the ECU-key updating method according to the first embodiment. Herein, Example B2 of the ECU-key updating method is an updating method for updating the ECU-management key with the ECU 50 mounted on the automobile 1. According to Example B2 of the ECU-key updating method, the eSIM_20 generates a new ECU key so as to update the ECU key with the ECU 50.

FIG. 11 shows a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21.

In the ECU 50, the key storage unit 54 stores the ECU-management key Km3 and an ECU key k7. Hereinafter, Example B2 of the ECU-key updating method will be described with reference to FIG. 11.

(Step S41)

The key generation part 21 of the eSIM_20 generate a new ECU key k8.

The ECU-key kn storing part 33 of the key storage unit 22 stores the new ECU key k8, which is generated by the key generation part 21, instead of the ECU key k7 preceding the ECU key k8 which is generated by the key generation part 21 and stored in advance.

(Step S42)

The encryption processor 24 of the eSIM_20 encrypts the ECU key k8 stored on the ECU-key kn storing part 33 of the key storage unit 22 by use of the ECU-management key Km3 stored on the ECU-management key Kmn storing part 31 of the key storage unit 22, thus generating an encrypted ECU key Km3(k8). The eSIM_20 transmits the encrypted ECU key Km3(k8) to the ECU 50.

(Step S43)

The encryption processor 53 of the ECU 50 decrypts the encrypted ECU key Km3(k8) from the eSIM_20 by use of the ECU-management key Km3 stored on the key storage unit 54. The decryption result yields the ECU key k8.

(Step S44)

The key storage unit 54 of the ECU 50 stores the ECU key k8, i.e. the decryption result of the encryption processor 53, instead of the ECU key k7 that is stored in advance. Thus, it is possible to update the ECU key stored on the key storage unit 54 of the ECU 50 with the latest ECU key k8.

According to Example B2 of the ECU-key updating method described above, it is possible to update the ECU key held by the ECU 50 with the latest ECU key generated by the ECU 50 mounted on the automobile 1.

Thus, it is possible to adjust the ECU key held by each ECU 50 mounted on the automobile 1 to the latest ECU key.

In addition, the ECU key is encrypted using the ECU-management key shared by the eSIM_20 and the ECU 50, and therefore the encrypted ECU key is transmitted from the eSIM_20 to the ECU 50. Thus, it is possible to improve security in updating ECU keys.

Example A4 of ECU-Management Key Updating Method

Figure 12:
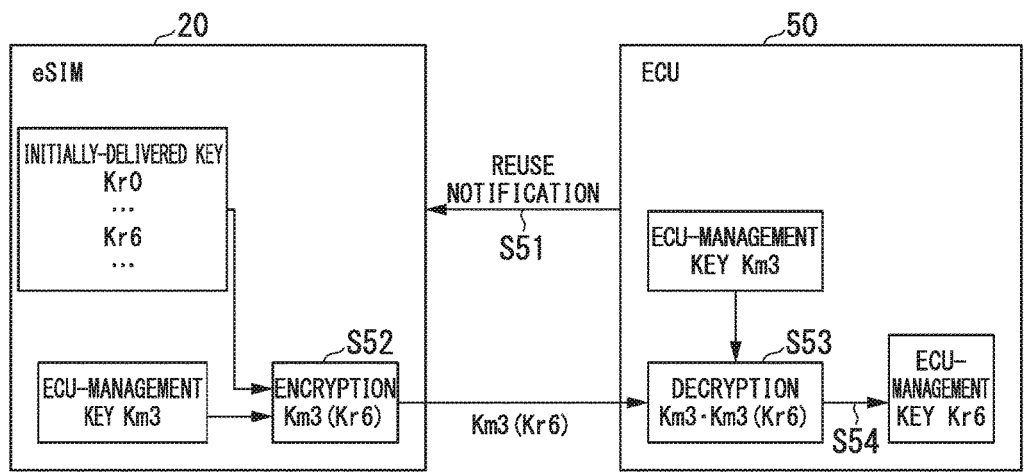
FIG. 12 is a sequence chart showing Example A4 of an ECU-management key updating method according to the first embodiment.

FIG. 12 is a sequence chart showing Example A4 of the ECU-management key updating method according to the first embodiment. Herein, Example A4 of the ECU-management key updating method is an updating method for updating the ECU-management key with the ECU 50 mounted on the automobile 1. According to Example A4 of the ECU-management key updating method, the eSIM_20 updates the ECU-management key held by the ECU 50 with the initially-delivered key. The ECU 50 that is selectively subjected to updating the ECU-management key with the initially-delivered key is the ECU 50 making a specific notification. The specific notification can be transmitted from the ECU 50 to the eSIM_20, or the specific notification can be input to the eSIM_20 by the outside of the automobile 1. The ECU-management key is updated with the initially-delivered key with respect to the ECU 50 making a reuse notification. Herein, the reuse notification is transmitted from the ECU 50 to the eSIM_20.

FIG. 12 shows a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21.

In the ECU 50, the key storage unit 54 stores the ECU-management key Km3. Hereinafter, Example A4 of the ECU-management key updating method will be described with reference to FIG. 12.

(Step S51)

The controller 51 of the ECU 50 transmits a reuse notification message, notifying the reuse of the ECU 50, to the eSIM_20. The eSIM_20 receives the reuse notification message from the ECU 50.

(Step S52)

The encryption processor 24 of the eSIM_20 encrypts the initially-delivered key stored on the initially-delivered key storage unit 25 by use of the ECU-management key Km3 stored on the ECU-management key Kmn storing part 1 of the key storage unit 22, thus generating an encrypted initially-delivered key. The initially-delivered key to be encrypted is arbitrarily selected from among the initially-delivered keys Kr0, Kr1, . . . , Krx stored on the initially-delivered key storage unit 25. In the case of FIG. 12, Kr6 is the initially-delivered key to be encrypted.

Therefore, the eSIM_20 encrypts the initially-delivered key Kr6 by use of the ECU-management key Km3 and thereby generate an encrypted initially-delivered key Km3(kr6). The eSIM_20 transmits the encrypted initially-delivered key Km3(Kr6) to the ECU 50 as a transmitting source of the reuse notification message.

(Step S53)

The encryption processor 53 of the ECU 50 decrypts the encrypted initially-delivered key Km3(Kr6) from the eSIM_20 by use of the ECU-management key Km3 stored on the key storage unit 54. The decryption result yields the initially-delivered key Kr6.

(Step S54)

The key storage unit 54 of the ECU 50 stores the initially-delivered key Kr6, i.e. the decryption result of the encryption processor 53, as an ECU-management key thereon. Thus, it is possible to update the ECU-management key stored on the key storage unit 54 of the ECU 50 with the initially-delivered key Kr6.

According to Example A4 of the ECU-management key updating method described above, it is possible to update the ECU-management key held by the ECU 50 making a specific notification with the initially-delivered key. The initially-delivered key being updated is encrypted using the ECU-management key shared by the eSIM_20 and the ECU 50, and therefore the encrypted initially-delivered key is transmitted from the eSIM_20 to the ECU 50. Thus, it is possible to improve security in updating the ECU-management key with the initially-delivered key.

In another automobile 1 that installs the ECU 50 updating the ECU-management key with the initially-delivered key according to Example A4 of the ECU-management key updating method, the eSIM_20 can successfully verify the updated key of the ECU 50 according to Example A2 of the ECU-management key updating method; hence, it is possible to reuse the ECU 50 in another automobile 1.

In this connection, it is possible to apply various examples to Example A4 of the ECU-management key updating method described above.

One application will be described below. The following description refers to the case where the ECU-management key stored on the key storage unit 54 of the ECU 50 is updated with latest one due to successfully verification of the eSIM_20 according to Example A1 of the ECU-management key updating method. In this case, the ECU 50 erases the initially-delivered key stored on the initially-delivered key storage unit 55 thereof, or the ECU 50 rewrites the initially-delivered key with an invalid value. In step S54 according to Example A4 of the ECU-management key updating method, the initially-delivered key storage unit 55 of the ECU 50 stores the initially-delivered key, i.e. the decryption result of the encryption processor 53, in step S53. Thus, it is possible to store the effective initially-delivered key on the initially-delivered key storage unit 55 again with respect to the ECU 50 which, after mounted on the automobile 1, the initially-delivered key stored on the initially-delivered key storage unit 55 is erased or rewritten with an invalid value. In another automobile 1 that installs the ECU 50 having the initially-delivered key storage unit 55 that stores the effective initially-delivered key again, the eSIM_20 can successfully verify the ECU 50 according to Example A1 of the ECU-management key updating method; hence, it is possible to reuse the ECU 50 in another automobile 1.

Another application will be described below. In the ECU 50 making an abandonment notification, the ECU-management key stored on the key storage unit 54 and the initially-delivered key stored on the initially-delivered key storage unit 25 are each updated with a predetermined abandonment key. In another automobile 1 that installs the abandoned ECU 50, the eSIM_20 may fail to verify the abandoned ECU 50 using an abandonment key; hence, it is possible to prevent the abandoned ECU 50 from being used in another automobile 1.

[Example of Key Backup Method]

Figure 13:
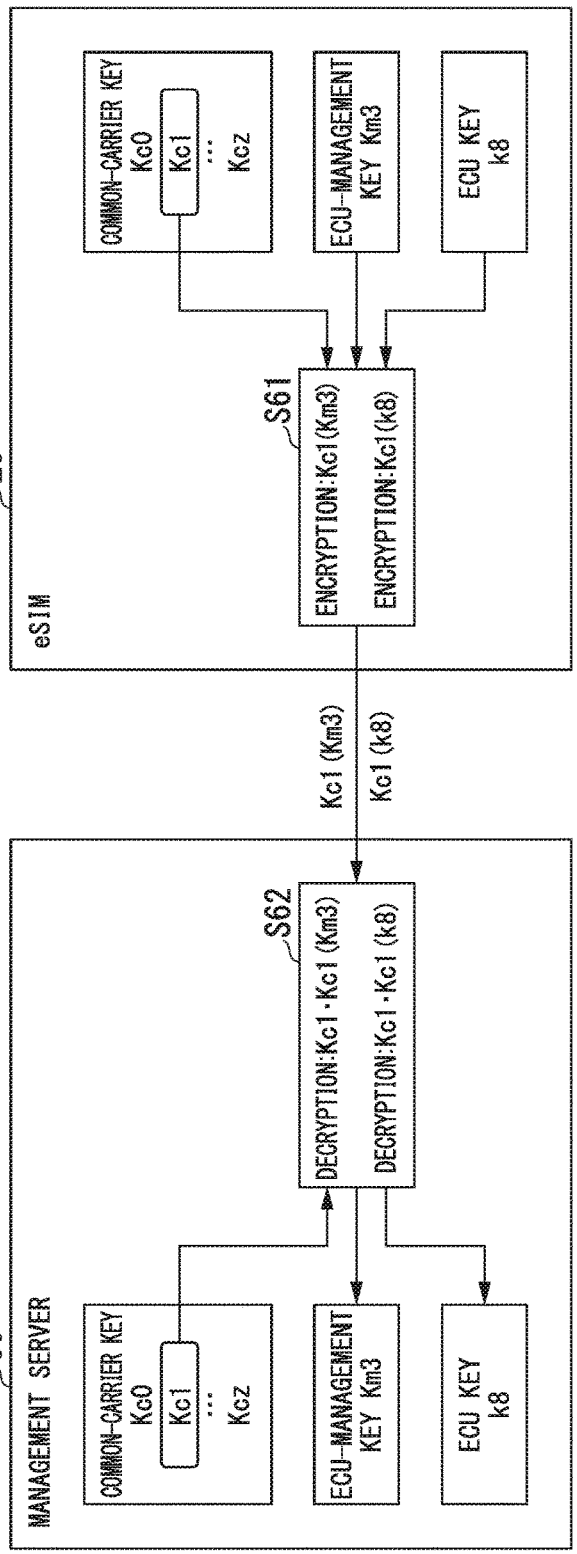
FIG. 13 is a sequence chart showing an example of a key backup method according to the first embodiment.

FIG. 13 is a sequence chart showing an example of a key backup method according to the first embodiment. The following description refers to a method for backing up the ECU-management key and the ECU key held by the automobile 1 with the management server 60.

FIG. 13 shows a procedure for interaction between the eSIM_20 of the management device 10 and the management server 60 in the management system shown in FIG. 1. In the eSIM_20, the ECU-management key Kmn storing area 31 of the key storage unit 22 stores the latest ECU-management key Km3 among ECU-management keys generated by the key generation part 21. The ECU-key kn storing area 33 of the key storage unit 22 stores the latest ECU key k8 among ECU keys generated by the key generation part 21.

Hereinafter, an example of a key backup method will be described with reference to FIG. 13. The following description refers to the situation that the eSIM_20 transmits or receives data with the management server 60 via the wireless communication part 11. Various parts of the management server 60 transmit or receive data with the eSIM_20 of the management device 10 via the communication part 61.

In this connection, it is possible to start the procedure of FIG. 13 only when the owner of the automobile 1 approves the backup of its keys.

(Step S61)

The encryption processor 24 of the eSIM_20 encrypts the ECU-management key Km3 stored on the ECU-management key Kmn storing part 31 of the key storage unit 22 and the ECU key k8 stored on the ECU-key kn storing part 33 of the key storage area 22 by use of the common-carrier key Kc1 shared by the common carrier among the common-carrier keys Kc0, Kc1, . . . , Kcy stored on the common-carrier key storage area 26. Thus, it is possible to generate an encrypted ECU-management key Kc1(Km3) by encrypting the ECU-management key Km3 using the common-carrier key Kc1, and it is possible to generate an encrypted ECU key Kc1(k8) by encrypting the ECU key k8 using the common-carrier key Kc1. The common-carrier key Kc1 shared by the eSIM_20 and the common carrier is set to the eSIM_20 in advance. The eSIM_20 transmits the encrypted ECU-management key Kc1(Km3) and the encrypted ECU key Kc1(k8) to the management server 60. At this time, the eSIM_20 notifies the management server 60 of an identification of the automobile 1 (i.e. a vehicle ID).

(Step S62)

The management part 63 of the management server 60 decrypts the encrypted ECU-management key Kc1(Km3) and the encrypted ECU key Kc1(k8), transmitted thereto from the eSIM_20, by use of the common-carrier key Kc1 shared by the eSIM_20. The decryption result yields the ECU-management key Km3 and the ECU key k8 in advance. The common-carrier key Kc1 shared by the eSIM_20 and the common carrier is set to the management server 60 in advance. The management data storage unit 64 of the management server 60 stores the ECU-management key Km3 and the ECU key k8 in connection with the vehicle ID transmitted thereto from the eSIM_20.

The management server 60 may directly hold the encrypted ECU-management key Kc1(Km3) and the encrypted ECU key Kc1(k8) without decrypting them. In this case, the management data storage unit 64 stores the encrypted ECU-management key Kc1(Km3) and the encrypted ECU key Kc1(k8) in connection with the vehicle ID transmitted thereto from the vehicle ID.

According to the aforementioned example of the key backup method, it is possible to back up the ECU-management key and the ECU key held by the automobile 1 with the management server 60.

As another example of the key backup method, it is possible to realize duplication by doubling the management device 10 in the automobile 1, wherein the ECU-management key and the ECU key are shared between the duplex management devices 10.

As described above, the first embodiment may achieve an effect of managing and updating keys held by the automobile 1.

Second Embodiment

The second embodiment of the present invention will be described below. The second embodiment employs the same configuration of the management system as the foregoing configuration of FIG. 1.

Figure 14:
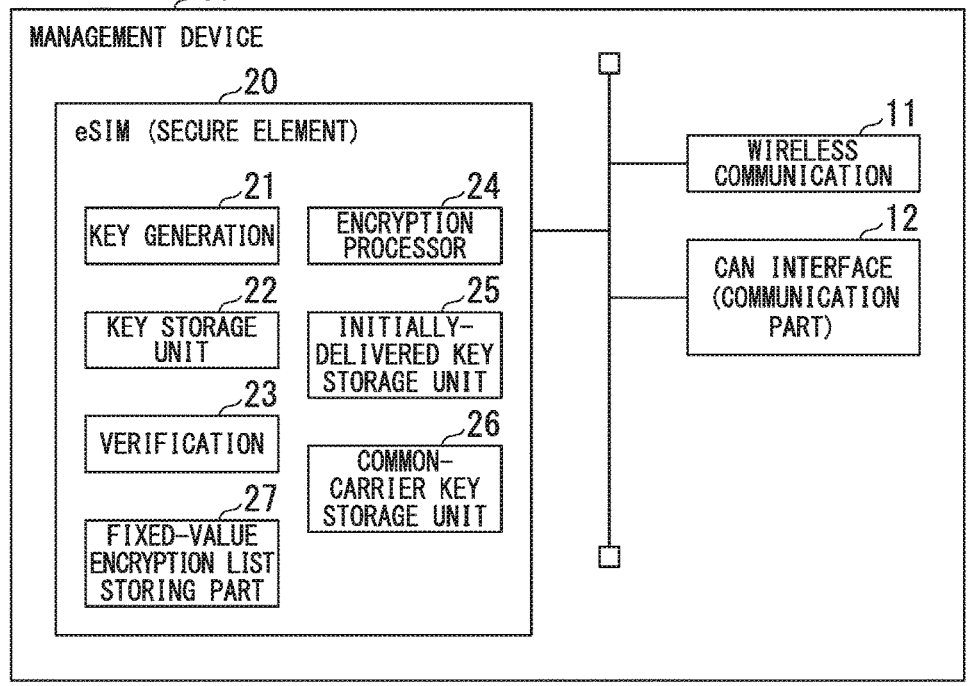
FIG. 14 is a configuration diagram of the management device 10 according to the second embodiment.

FIG. 14 is a configuration diagram showing the management device 10 according to the second embodiment. In FIG. 14, parts corresponding to the foregoing parts of FIG. 2 are denoted using the same reference signs; hence, their descriptions will be omitted here. The management device 10 of FIG. 14 differs from the management device 10 of FIG. 2 in that the eSIM_20 further includes a fixed-value encryption list storing part 27.

The fixed-value encryption list storing part 27 stores a fixed-value encryption list. The fixed-value encryption list is a list describing combinations between encrypted fixed values, which are produced by encrypting fixed values using the initially-delivered keys Kr0, Kr1, . . . , Krx stored on the initially-delivered key storage unit 25, and the initially-delivered keys used to encryption for encrypted fixed values. The fixed-value encryption list is stored on the fixed-value encryption list storing part 27 in advance.

Figure 15:
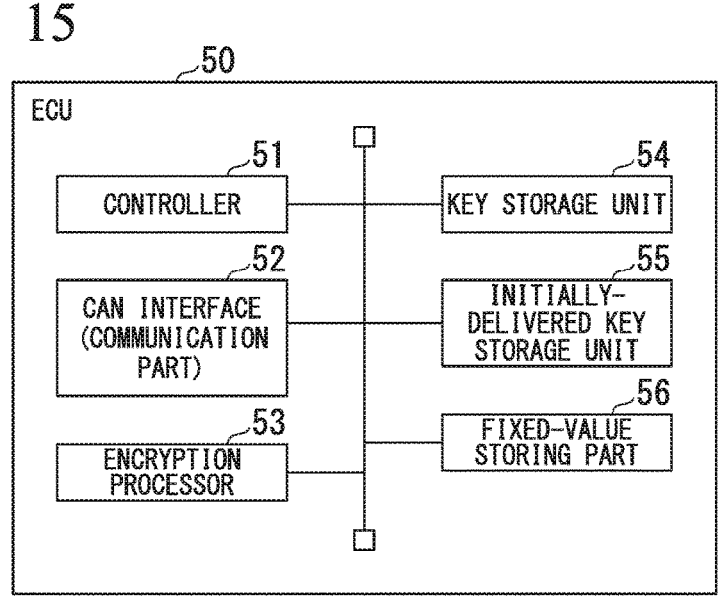
FIG. 15 is a configuration diagram of the ECU 50 according to the second embodiment.

FIG. 15 is a configuration diagram of the ECU 50 according to the second embodiment, in FIG. 15, parts corresponding to the foregoing parts of FIG. 5 are denoted using the same reference signs; hence, their descriptions will be omitted here. The ECU 50 of FIG. 15 differs from the ECU 50 of FIG. 5 in that the ECU 50 further includes a fixed-value storing part 56. The fixed-value storing part 56 stores fixed values. The fixed values are stored on the fixed-value storing part 56 in advance.

Next, a management method according to the second embodiment will be described below. The following description refers to the situation that the management device 10 transmits or receives data with the ECU 50 through the controller on-board network 40. The eSIM_20 of the management device 10 transmits or receives data with the ECU 50 through the CAN interface 12. Various parts of the ECU 50 transmits or receives data with the eSIM_20 of the management device 10 through the CAN interface 52.

Example C1 of ECU-Management Key Updating Method

Figure 16:
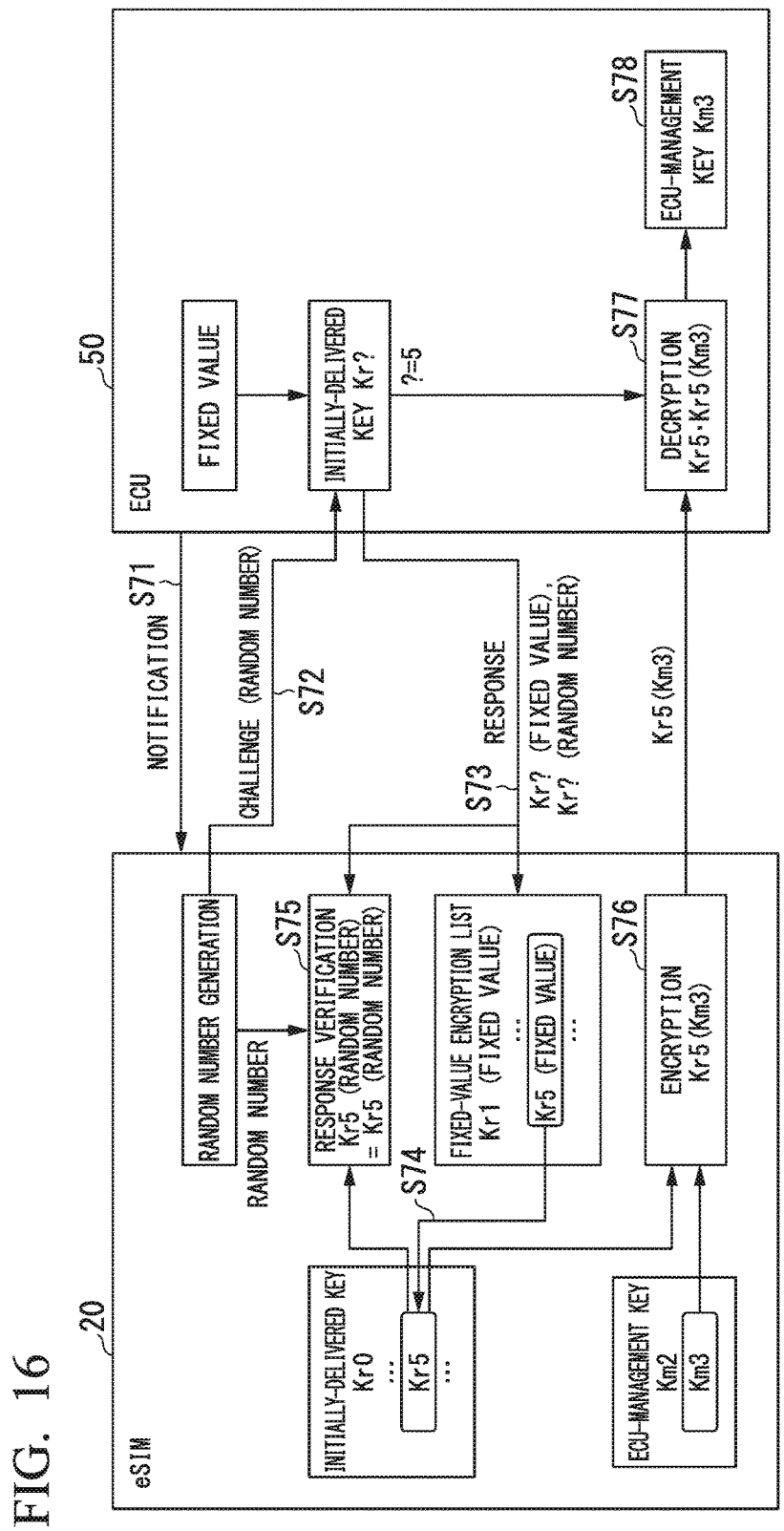
FIG. 16 is a sequence chart showing Example C1 of an ECU-management key updating method according to the second embodiment.

FIG. 16 is a sequence chart showing Example C1 of the ECU-management key updating method according to the second embodiment. Herein, Example C1 of the ECU-management key updating method is an updating method for updating ECU-management keys with the ECUs 50 mounted on the automobile 1. As applications for Example C1 of the ECU-management key updating method, it is possible to mention Applications 1 and 2 of ECU-management key updating methods described above.

FIG. 16 shows a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21. The ECU-management key Km(n−1) storing area 32 of the key storage unit 22 stores the ECU-management key Km2 preceding the latest ECU-management key Km3 among ECU-management keys generated by the key generation part 21.

In the ECU 50, the initially-delivered key storage unit 55 stores the initially-delivered key Kr? thereon. The eSIM_20 does not recognize the initially-delivered key Kr? held by the ECU 50. Hereinafter, Example C1 of the ECU-management key updating method will be described with reference to FIG. 16.

(Step S71)
The controller 51 of the ECU 50 transmits a mounting notification message, notifying the mounting of the ECU 50 on the automobile 1, to the eSIM_20. The eSIM_20 receives the mounting notification message transmitted thereto from the ECU 50.

(Step S72)
The verification part 23 of the eSIM_20 generates a random number as a challenge. The eSIM_20 transmits the challenge (i.e. the random number) to the ECU 50 as a transmitting source of the mounting notification message.

(Step S73)
The encryption processor 53 of the ECU 50 encrypts the challenge (i.e. the random number) from the eSIM_20 by use of the initially-delivered key Kr? stored on the initially-delivered key storage unit 55, thus generating encrypted data Kr?(random-number). The encrypted data Kr?(random-number) is used as a response. The encryption processor 53 of the ECU 50 encrypts the fixed value stored on the fixed-value storing part 56 by use of the initially-delivered key Kr? stored on the initially-delivered key storage unit 55, thus generating encrypted data Kr?(fixed-value). The ECU 50 transmits the encrypted data Kr?(fixed-value) and the response Kr?(random-number) to the eSIM_20.

(Step S74)
The verification part 23 of the eSIM_20 compares the encrypted data Kr?(fixed-value) from the ECU 50 with encrypted fixed values described on the fixed-value encryption list stored on the fixed-value encryption list storing part 27. In the case of FIG. 16, the initially-delivered key Kr? held by the ECU 50 is Kr5. Therefore, the encrypted data Kr?(fixed-value) transmitted from the ECU 50 is Kr5(fixed-value). Through comparison with encrypted fixed values described on the fixed-value encryption list, the encrypted fixed value Kr5(fixed-value) on the fixed-value encryption list matches the encrypted data Kr5(fixed-value) transmitted from the ECU 50. The verification part 23 retrieves from the initially-delivered key storage unit 55 the initially-delivered key Kr5 combined with the encrypted fixed value Kr5(fixed-value) that matches the encrypted data Kr5(fixed-value) transmitted from the ECU 50.

(Step S75)
The verification part 23 of the eSIM_20 verifies the response Kr?(random-number) from the ECU 50 by use of the initially-delivered key Kr5 obtained in step S74.

As the verification method of the response Kr?(random-number), it is possible to mention Examples D1 and D2 of verification methods described below.

Example D1 of Verification Method

The verification part 23 encrypts the challenge (i.e. the random number) using the initially-delivered key Kr5 so as to determine whether the encryption result matches the response Kr?(random-number). The verification part 23 may successfully verify the response Kr?(random-number) when the determination result indicates that the encryption result matches the response Kr?(random-number). In contrast, the verification part 23 fails to verify the response Kr?(random-number) when the determination result indicates that the encryption result does not match the response Kr?(random-number).

Example D2 of Verification Method

The verification part 23 decrypts the response Kr?(random-number) using the initially-delivered key Kr5 so as to determine whether the decryption result matches the challenge (i.e. the random number). The verification part 23 may successfully verify the response Kr?(random-number) when the determination result indicates that the decryption result matches the challenge (i.e. the random number). In contrast, the verification part 23 fails to verify the response Kr?(random-number) when the determination result indicates that the decryption result does not match the challenge (i.e. the random number).

Upon successfully verifying the response Kr?(random-number), the eSIM_20 proceeds to step S76. Due to failure to verify the response Kr?(random-number), the eSIM_20 exits the procedure of FIG. 16.

In this connection, it is possible to carry out a predetermined error process due to failure to verify the response Kr?(random-number).

(Step S76)
The encryption processor 24 of the eSIM_20 encrypts the ECU-management key Km3 stored on the ECU-management key Kmn storing part 31 of the key storage unit 22 by use of the initially-delivered key that is used to successfully verify the response Kr?(random-number) in step S75, thus generating an encrypted ECU-management key. In the case of FIG. 16, Kr5 is used as the initially-delivered key that is used to successfully verify the response Kr?(random-number) in step S75. In the case of FIG. 16, therefore, the encryption processor 24 generates an encrypted ECU-management key Kr5(Km3) by encrypting the ECU-management key Km3 using the initially-delivered key Kr5. The eSIM_20 transmits the encrypted ECU-management key Kr5(Km3) to the ECU 50 as a transmitting source of the response Kr?(random-number).

(Step S77)
The encryption processor 53 of the ECU 50 decrypts the encrypted ECU-management key Kr5(Km3) from the eSIM_20 by use of the initially-delivered key Kr5 stored on the initially-delivered key storage unit 55. The decryption result yields the ECU-management key Km3.

(Step S78)

The key storage unit 54 of the ECU 50 stores the ECU-management key Km3, i.e. the decryption result of the encryption processor 53, thereon. Thus, it is possible to update the ECU-management key stored on the key storage unit 54 of the ECU 50 with the latest ECU-management key Km3.

According to Example C1 of the ECU-management key updating method, it is possible to update the ECU-management key held by the ECU 50 with the latest ECU-management key generated by the ECU 50 mounted on the automobile 1. Thus, it is possible to adjust the ECU-management key held by each ECU 50 mounted on the automobile 1 to the latest ECU-management key.

The ECU-management key is encrypted using the initially-delivered key shared by the eSIM_20 and the ECU 50, and therefore the encrypted ECU-management key is transmitted from the eSIM_20 to the ECU 50. Thus, it is possible to improve security in updating ECU-management keys.

The present embodiment is designed to specify the initially-delivered key used to encrypt the response Kr?(random-number) by use of the fixed-value encryption list; this eliminates the necessity of carrying out response matching processes in the foregoing Examples A1, A2 of ECU-management key updating methods; hence, it is possible to reduce the amount of processing.

Example C2 of ECU-Management Key Updating Method

Figure 17:
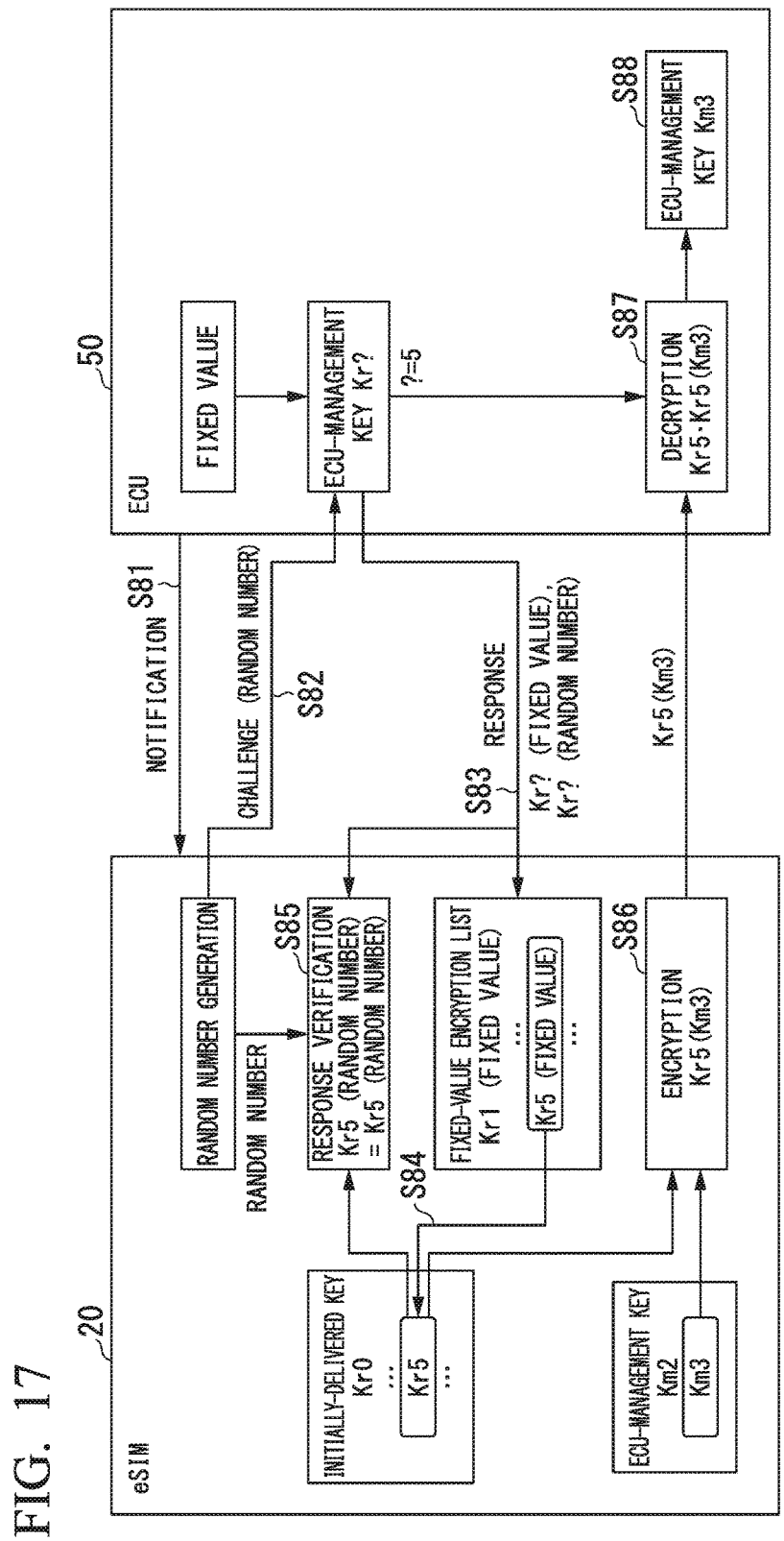
FIG. 17 is a sequence chart showing Example C2 of an ECU-management key updating method according to the second embodiment.

FIG. 17 is a sequence chart showing Example C2 the ECU-management key updating method according to the second embodiment. Herein, Example C2 of the ECU-management key updating method is an updating method for updating the ECU-management key with the ECU 50 mounted on the automobile 1. As applications to Example C2 of the ECU-management key updating method, it is possible to mention Applications 1 and 2 of ECU-management key updating method described above.

FIG. 17 shows a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21. The ECU-management key Km(n−1) storing part 32 of the key storage unit 22 stores the ECU-management key Km2 preceding the latest ECU-management key Km3 among ECU-management keys generated by the key generation part 21.

In the ECU 50, the key storage unit 54 stores the initially-delivered key Kr? as its ECU-management key. For example, this situation may refer to the case where the initially-delivered key Kr? is written into the ECU 50 as an initial value of its ECU-management key. The eSIM_20 does not recognize the initially-delivered key Kr? held by the ECU 50. According to Example C2 of the ECU-management key updating method, the ECU 50 does not necessarily provide the initially-delivered key storage unit 55. Hereinafter, Example C2 of the ECU-management key updating method will be described with reference to FIG. 17.

(Step S81)

The controller 51 of the ECU 50 transmits a mounting notification message, notifying the mounting of the ECU 50 on the automobile 1, to the eSIM_20. The eSIM_20 receives the mounting notification message transmitted thereto from the ECU 50.

(Step S82)

The verification part 23 of the eSIM_20 generates a random number as a challenge. The eSIM_20 transmits the challenge (i.e. the random number) to the ECU 50 as a transmitting source of the mounting notification message.

(Step S83)

The encryption processor 53 of the ECU 50 encrypts the challenge (i.e. the random number) from the eSIM_20 by use of the ECU-management key stored on the key storage unit 54 (i.e. the ECU-management key corresponding to the initially-delivered key Kr?), thus generating encrypted data Kr?(random-number). The encrypted data Kr?(random-number) is used as a response. The encryption processor 53 of the ECU 50 encrypts the fixed value stored on the fixed-value storing part 56 by use of the ECU-management key stored on the key storage unit 54 (i.e. the ECU-management key corresponding to the initially-delivered key Kr?), thus generating encrypted data Kr?(fixed-value). The ECU 50 transmits the encrypted data Kr?(fixed-value) and the response Kr?(random-number) to the eSIM_20.

(Step S84)

The verification part 23 of the eSIM_20 compares the encrypted data Kr?(fixed-value) from the ECU 50 with encrypted fixed values described on the fixed-value encryption list stored on the fixed-value encryption list storing part 27. In the case of FIG. 17, Kr5 is used as the initially-delivered key Kr? held by the ECU 50. Therefore, the encrypted data Kr?(fixed-value) from the ECU 50 should be Kr5(fixed-value). Through comparison with encrypted fixed values on the fixed-value encryption list, the encrypted data Kr5(fixed-value) from the ECU 50 matches the encrypted fixed value Kr5 (i.e. the fixed value) on the fixed-value encryption list. The verification part 23 obtains from the initially-delivered key storage unit 25 the initially-delivered key Kr5 combined with the encrypted fixed value Kr5 (i.e. the fixed value) that matches the encrypted data Kr5(fixed-value) from the ECU 50 among combinations of the fixed-value encryption list.

(Step S85)

The verification part 23 of the eSIM_20 verifies the response Kr? (i.e. the random number) from the ECU 50 by use of the initially-delivered key Kr5 obtained in step S84.

As the verification method of the response Kr? (i.e. the random number), it is possible to mention Examples D1 and D2 of verification methods described above.

Upon successfully verifying the response Kr? (i.e. the random number), the eSIM_20 proceeds to step S86. Due to failure to verify the response Kr? (i.e. the random number), the eSIM_20 exits the procedure of FIG. 17.

In this connection, it is possible to carry out a predetermined error process due to failure to verify the response Kr? (i.e. the random number).

The encryption processor 24 of the eSIM_20 encrypts the ECU-management key Km3 stored on the ECU-management key Kmn storing part 31 of the key storage unit 22 by use of the initially-delivered key that is used to successfully verify the response Kr? (i.e. the random number) in step S85, thus generating an encrypted ECU-management key. In the case of FIG. 17. Kr5 is used as the initially-delivered key that is used to successfully verify the response Kr? (i.e. the random number) in step S85. In the case of FIG. 17, the encryption processor 24 generates an encrypted ECU-management key Kr5(Km3) by encrypting the ECU-management key Km3 using the initially-delivered key Kr5. The eSIM_20 transmits the encrypted ECU-management key Kr5(Km3) to the ECU 50 as a transmitting source of the response Kr? (i.e. the random number).

(Step S87)

The encryption processor 53 of the ECU 50 decrypts the encrypted ECU-management key Kr5(Km3) from the eSIM_20 by use of the ECU-management key stored on the key storage unit 54 (i.e. the ECU-management key corresponding to the initially-delivered key Kr5). The decryption result yields the ECU-management key Km3.

(Step S88)

The key storage unit 54 of the ECU 50 stores the ECU-management key Km3, i.e. the decryption result of the encryption processor 53. Thus, it is possible to update the ECU-management key stored on the key storage unit 54 of the ECU 50 with the latest ECU-management key Km3.

According to Example C2 of the ECU-management key updating method, it is possible to update the ECU-management key held by the ECU 50 with the latest ECU-management key generated by the ECU 50 mounted on the automobile 1. Thus, it is possible to adjust the ECU-management key held by each ECU 50 mounted on the automobile 1 to the latest ECU-management key.

The ECU-management key is encrypted using the initially-delivered key shared by the eSIM_20 and the ECU 50, and therefore the encrypted ECU-management key is transmitted from the eSIM_20 to the ECU 50. Thus, it is possible to improve security in updating ECU-management keys.

The present embodiment is designed to specify the initially-delivered key used to encrypt the response Kr? (i.e. the random number) with reference to the fixed-value encryption list. This eliminates the necessity of carrying out response matching processes according to Examples A1, A2 of ECU-management key updating method described above; hence, it is possible to reduce the amount of processing.

According to the second embodiment described above, it is possible to achieve an effect of managing and updating keys held by the automobile 1.

The third embodiment of the present invention will be described below. The management system of the third embodiment has the same configuration of FIG. 1. The management device 10 of the third embodiment has the same configuration of FIG. 2.

Figure 18:
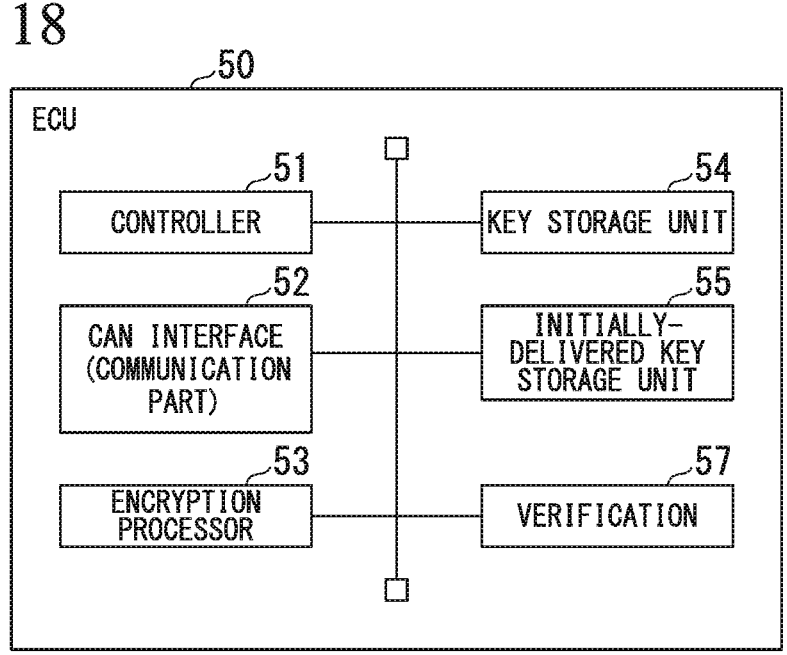
FIG. 18 is a configuration diagram of the ECU 50 according to the third embodiment.

FIG. 18 is a configuration diagram of the ECU 50 according to the third embodiment. In FIG. 18, parts corresponding to the foregoing parts of FIG. 5 are denoted using the same reference signs; hence, their descriptions will be omitted here. The ECU 50 of FIG. 18 differs from the ECU 50 of FIG. 5 in that the ECU 50 further includes a verification part 57. The verification part 57 verifies data exchange.

Next, a management method of the third embodiment will be described below. The following description refers to the situation that the management device 10 transmits or receives data with the ECU 50 through the controller on-board network 40. The eSIM_20 of the management device 10 transmits or receives data with the ECU 50 through the CAN interface 12. Various parts of the ECU 50 transmits or receives data with the eSIM_20 of the management device 10 through the CAN interface 52.

Example E1 of ECU-Management Key Updating Method

Figure 19:
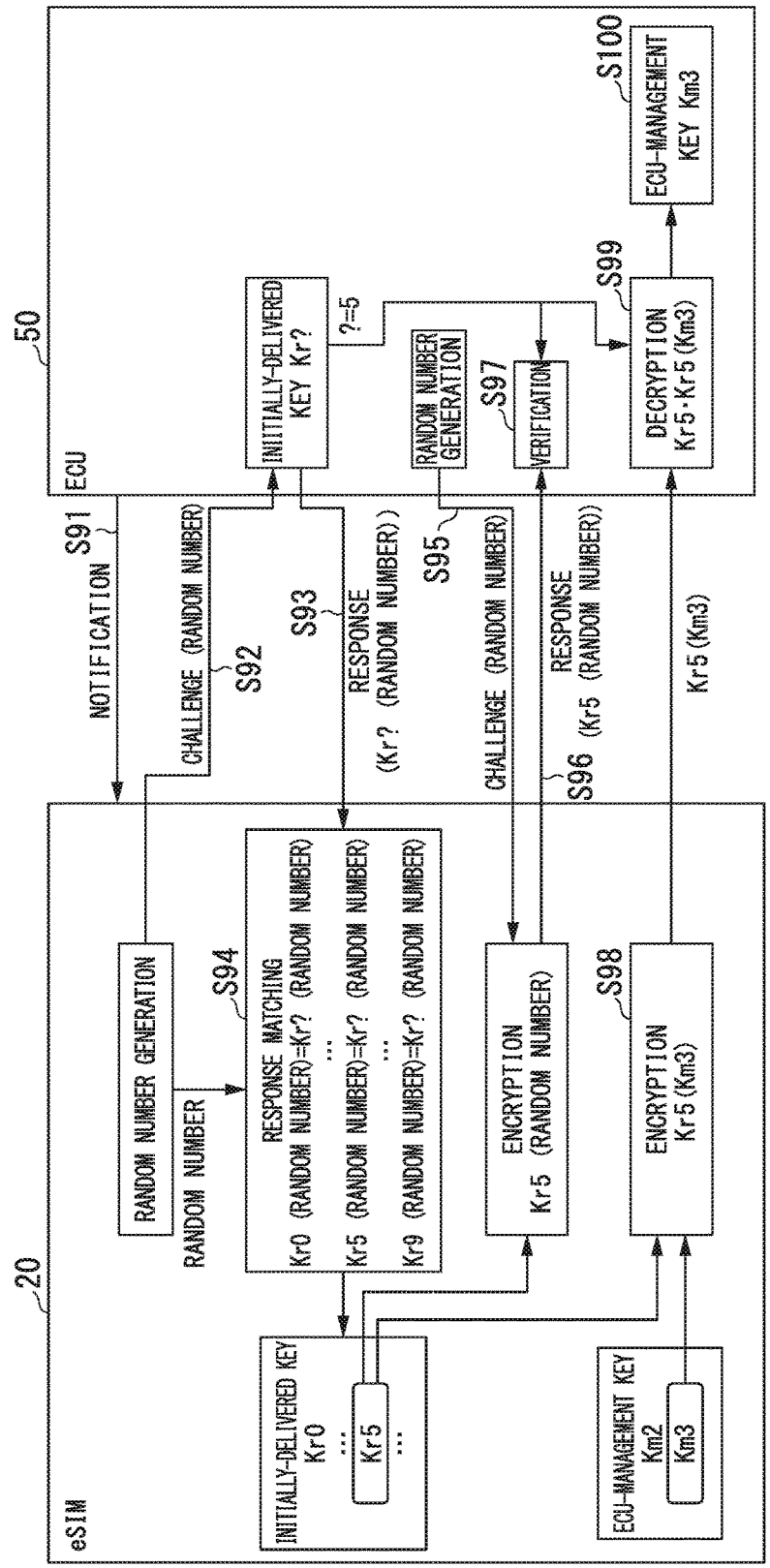
FIG. 19 is a sequence chart showing Example E1 of an ECU-management key updating method according to the third embodiment.

FIG. 19 is a sequence chart showing Example E1 of the ECU-management key updating method according to the third embodiment. Herein, Example E1 of the ECU-management key updating method is an updating method for updating the ECU-management key with the ECU 50 mounted on the automobile 1. As applications to Example E1 of the ECU-management key updating method, it is possible to mention Applications 1 and 2 of ECU-management key updating methods described above.

FIG. 19 shows a procedure for interaction between the eSIM_20 of the management device 10 and the ECU 50 in the automobile 1. In the eSIM_20, the ECU-management key Kmn storing part 31 of the key storage unit 22 stores the latest ECU-management key Km3 among ECU-management keys generated by the key generation part 21. The ECU-management key Km(n−1) storing part 32 of the key storage unit 22 stores the ECU-management key Km2 preceding the latest ECU-management key Km3 among ECU-management keys generated by the key generation part 21.

In the ECU 50, the initially-delivered key storage unit 55 stores the initially-delivered key Kr? thereon. The eSIM_20 does not recognize the initially-delivered key Kr? held by the ECU 50. Hereinafter, Example E1 of the ECU-management key updating method will be described with reference to FIG. 19.

(Step S91)

The controller 51 of the ECU 50 transmits a mounting notification message, notifying the mounting of the ECU 50 on the automobile 1, to the eSIM_20. The eSIM_20 receives the mounting notification message transmitted thereto from the ECU 50.

(Step S92)

The verification part 23 of the eSIM_20 generates a random number as a challenge. The eSIM_20 transmits the challenge (i.e. the random number) to the ECU 50 as a transmitting source of the mounting notification message.

(Step S93)

The encryption processor 53 of the ECU 50 encrypts the challenge (i.e. the random number) from the eSIM_20 by use of the initially-delivered key K0 stored on the initially-delivered key storage unit 55, thus generating encrypted data Kr?(random-number). The ECU 50 transmits the encrypted data Kr?(random-number) as a response to the eSIM_20.

(Step S94)

The verification part 23 of the eSIM_20 carries out a response matching process for the response Kr? (random-number) from the ECU 50. In the response matching process, the verification part 23 verifies the response Kr? (random-number) by use of the initially-delivered keys Kr0, Kr1, . . . , Krx stored on the initially-delivered key storage unit 25. As the method for verifying the response Kr? (random-number), it is possible to mention Examples 1 and 2 of verification methods described above.

The eSIM_20 proceeds to subsequent processes when the verification part 23 successfully verifies the response Kr? (random-number) in step S94. The eSIM_20 exits the procedure of FIG. 19 when the verification part 23 the response Kr?(random-number) in step S94. In this connection, it is possible to carry out a predetermined error process when the verification part 23 fails to verify the response Kr?(random-number) in step S94.

(Step S95)

The verification part 57 of the ECU 50 generates a random number as a challenge. The ECU 50 transmits the challenge (i.e. the random number) to the eSIM_20.

(Step S96)

The encryption processor 24 of the eSIM_20 encrypts the challenge (i.e. the random number) from the ECU 50 by use of the initially-delivered key that is used to successfully verify the response Kr? (i.e. the random number) in step S94, thus generating encrypted data Kr?(random-number). In the case of FIG. 19, Kr5 is used as the initially-delivered key Kr? held by the ECU 50. Therefore, the initially-delivered key Kr5 is used to successfully verify the response Kr? (i.e. the random number) in step S94. In the case of FIG. 19, the encryption processor 24 generates encrypted data Kr5(random-number) by encrypting the challenge (i.e. the random number) using the initially-delivered key Kr5. The eSIM_20 transmits the encrypted data Kr5(random-number) as a response to the ECU 50 as a transmitting source of the challenge: (i.e. the random number).

(Step S97)

The verification part 57 of the ECU 50 verifies the response Kr5(random-number) from the eSIM_20 by use of the initially-delivered key Kr5 stored on the initially-delivered key storage unit 55.

As the verification method of the response Kr5(random-number), it is possible to mention Examples F1 and F2 of verification methods described below.

Example F1 of Verification Method

The verification part 57 encrypts the challenge (i.e. the random number) that is transmitted to the eSIM_20 in step S95 by use of the initially-delivered key Kr5 so as to determine whether the encryption result matches the response Kr5(random-number) from the eSIM_20. The verification part 57 may successfully verify the response Kr5 (random-number) when the encryption result matches the response Kr5(random-number) from the eSIM_20. On the other hand, the verification part 57 fails to verify the response Kr5(random-number) when the determination result indicates that the encryption result does not match the response Kr5(random-number) from the eSIM_20.

Example F2 of Verification Method

After the response Kr5(random-number) from the eSIM_20 is decrypted using the initially-delivered key Kr5, the verification part 57 determines whether the decryption result matches the challenge (i.e. the random number) that is transmitted to the eSIM_20 in step S95. The verification part 57 may successfully verify the response Kr5(random-number) when the determination result indicates that the decryption result matches the challenge (i.e. the random number) that is transmitted to the eSIM_20 in step S95. On the other hand, the verification part 57 fails to verify the response Kr5(random-number) when the determination result indicates that the decryption result does not match the challenge (i.e. the random number) that is transmitted to the eSIM_20 in step S95.

The ECU 50 proceeds to subsequent processes when the verification part 57 successfully verities the response Kr5 (random-number). In contrast, the ECU 50 exits the procedure of FIG. 19 when the verification part 57 fails to verify the response Kr5(random-number) in step S97. In this connection, it is possible to carry out a predetermined error process when the verification part 57 fails to verify the response Kr5(random-number) in step S97.

(Step S98)

The encryption processor 24 of the eSIM_20 encrypts the ECU-management key Km3 stored on the ECU-management key Kmn storing part 31 of the key storage unit 22 by use of the initially-delivered key Kr5 that is used to successfully verify the response Kr?(random-number) in step S94, thus generating an encrypted ECU-management key Kr5(Km3). The eSIM_20 transmits the encrypted ECU-management key Kr5(Km3) to the ECU 50 as a transmitting source of the response Kr?(random-number).

(Step S99)

The encryption processor 53 of the ECU 50 decrypts the encrypted ECU-management key Kr5(Km3) from the eSIM_20 by use of the initially-delivered key Kr5 stored on the initially-delivered key storage unit 55. The decryption result yields the ECU-management key Km3.

(Step S100)

The key storage unit 54 of the ECU 50 stores the ECU-management key Km3, i.e. the decryption result of the encryption processor 53. Thus, it is possible to update the ECU-management key stored on the key storage unit 54 of the ECU 50 with the latest ECU-management key Km3.

According to Example E1 of the ECU-management key updating method, it is possible to update the ECU-management key held by the ECU 50 with the latest ECU-management key generated by the ECU 50 mounted on the automobile 1. Thus, it is possible to adjust the ECU-management key held by each ECU 50 mounted on the automobile 1 with the latest ECU-management key.

In addition, the ECU-management key is encrypted using the initially-delivered key shared by the eSIM_20 and the ECU 50, and therefore the encrypted ECU-management key is transmitted from the eSIM_20 to the ECU 50. Thus, it is possible to improve security in updating ECU-management keys.

Moreover, it is possible to conduct mutual authentication between the eSIM_20 and the ECU 50 in such a way that the eSIM_20 authenticates the ECU 50 (steps S92, S93, S94) while the ECU 50 authenticates the eSIM_20 (steps S95, S96, S97). Thus, it is possible to improve security in updating ECU-management keys with the ECUs 50.

The third embodiment is designed to install the verification part 57 in the ECU 50 of the first embodiment. However, it is possible to install the verification part 57 in the ECU 50 of the second embodiment shown in FIG. 5 so as to adopt the procedure of authenticating the eSIM_20 with the ECU 50 according to steps S95, S96, S97 in FIG. 19.

Heretofore, the foregoing embodiments of the present invention have been described in detail with reference to the drawings; however, concrete configurations are not necessarily limited to those embodiments; hence, the present invention may embrace any design changes without departing from the essential matters of the invention.

For example, the eSIM_20 of the management device 10 may obtain an initially-delivered key that is newly issued by a predetermined server managing initially-delivered keys so as to store the obtained initially-delivered key on the initially-delivered key storage unit 25. For example, the management server 60 may manage initially-delivered keys. In this case, the eSIM_20 obtains an initially-delivered key that is newly issued by the management server 60 so as to store the obtained initially-delivered key on the initially-delivered key storage unit 25. For example, the eSIM_20 may make an inquiry about new issuance of any initially-delivered key with the management server 60 at a predetermined timing (or periodically). Alternatively, the management server 60 may notify the eSIM_20 of new issuance of an initially-delivered key. Thus, it is possible for the eSIM_20 to hold the newly issued initially-delivered key, and therefore it is possible for the ECU 50 to hold the newly issued initially-delivered key.

The foregoing embodiments refer to the eSIM or SIM as an example of secure elements; but this is not a restriction.

As secure element, for example, it is possible to use tamper-resistant encryption processing chip called TPM (Trusted Platform Module). For example, Non-Patent Literature 3 discloses TPM.

The foregoing embodiments include the management server 60; but it is unnecessary to provide the management server 60. In the automobile 1, the management device 10 generates and stores ECU-management keys so as to transmit them to the ECU 50, and therefore it is possible to manage and update ECU-management keys held by the automobile 1.

It is preferable that the management device 10 and the ECU 50 implement secure boot. Owing to secure boot, it is possible to verify the correctness of the operating system (OS) of a computer when starting its operation. For example, Non-Patent Literatures 3, 4, 5, and 6 disclose secure boot.

The management methods of the foregoing embodiments can be applied to various scenes of managing the automobile 1 such as the sales, periodical inspection, vehicle inspection, resale, and cassation of the automobile 1.

The foregoing embodiments refer to an automobile as an example of a vehicle; but those embodiments can be applied to other types of vehicles other than automobiles, such as motorized bicycles and railcars.

Figure 20:
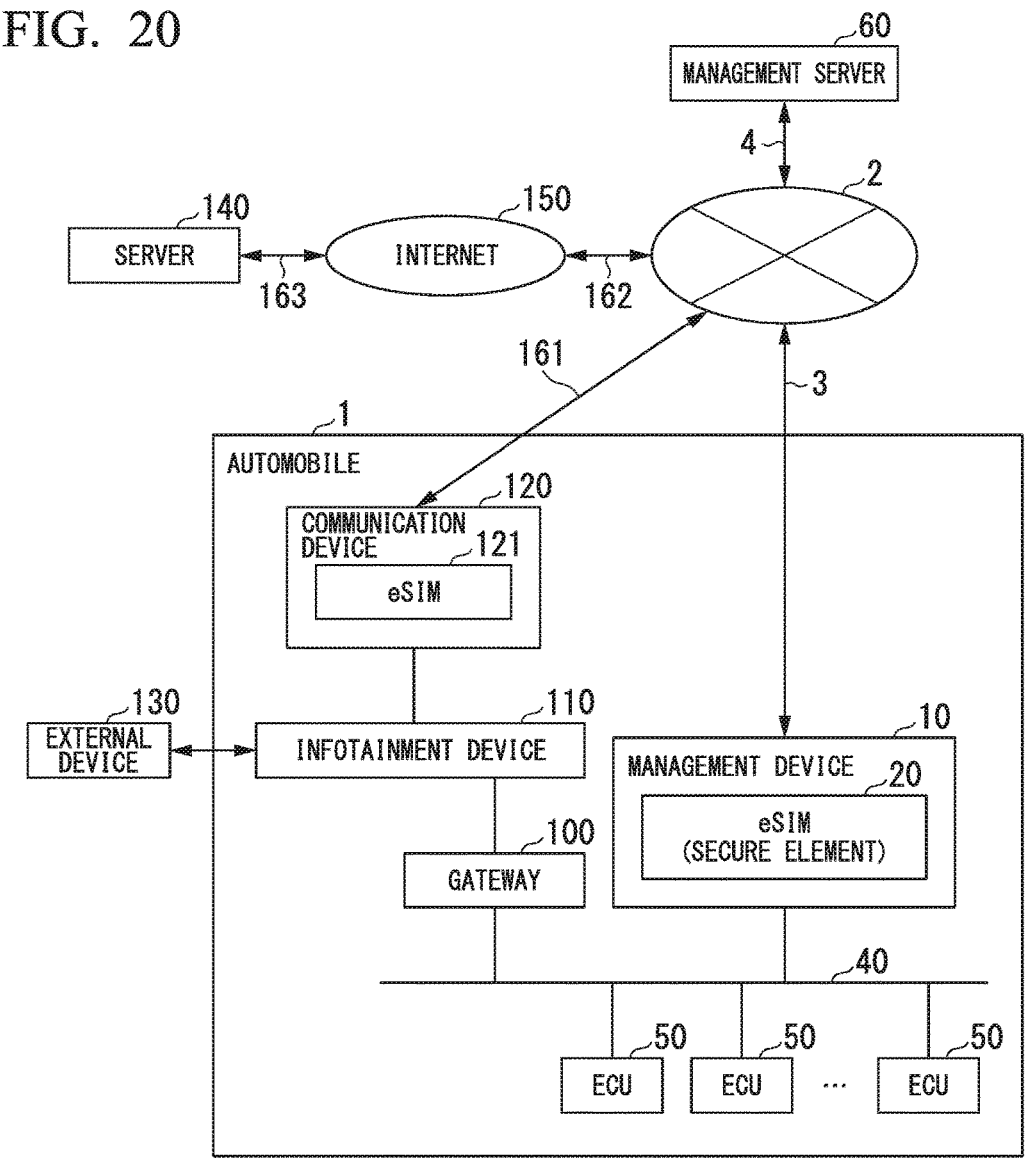
FIG. 20 is a configuration diagram of an automobile 1 according to another embodiment.

FIG. 20 is a configuration diagram showing another embodiment of the automobile 1. In FIG. 20, parts corresponding to the foregoing parts of FIG. 1 are denoted using the same reference signs; hence, their descriptions will be omitted. Hereinafter, another embodiment of the automobile 1 will be described with reference to FIG. 20.

The automobile 1 shown in FIG. 20 additionally includes a gateway 100, an infotainment device 110, and a communication device 120 together with the foregoing parts of the automobile 1 show in FIG. 1. The communication device 120 includes an eSIM_121. The eSIM_121 is an eSIM that stores subscriber information of the wireless communication network 2. Therefore, the communication device 120 is able to use the wireless communication network 2 by use of the eSIM_121. The communication device 120 is connected to the wireless communication network 2 through a wireless communication line 161 that is established using the eSIM_20. The wireless communication network 2 is connected to the Internet 150 through a communication line 162. A server 140 is connected to the Internet 150 through a communication line 163. The communication device 120 communicates with the server 140 connected to the Internet 150 through the wireless communication network 2.

In the automobile 1, the infotainment device 110 transmits or receives data with the server 140 via the communication device 120. The infotainment device 110 is connected to an external device 130 so as to exchange data with external device 130. As the external device 130, for example, it is possible to mention a mobile communication terminal and an audio-visual device.

In the automobile 1, the gateway 100 is connected to the controller on-board network 40. The infotainment device 110 transmits or receives data with the ECUs 50 and the management device 10 connected to the controller on-board network 40 via the gateway 100. The gateway 100 monitors transmission/reception of data between the infotainment device 110 and the ECU 50 as well as transmission/reception of data between the infotainment device 110 and the management device 10.

Fourth Embodiment

The fourth embodiment will be described with reference to FIGS. 21 to 27.

Example 1

Figure 21:
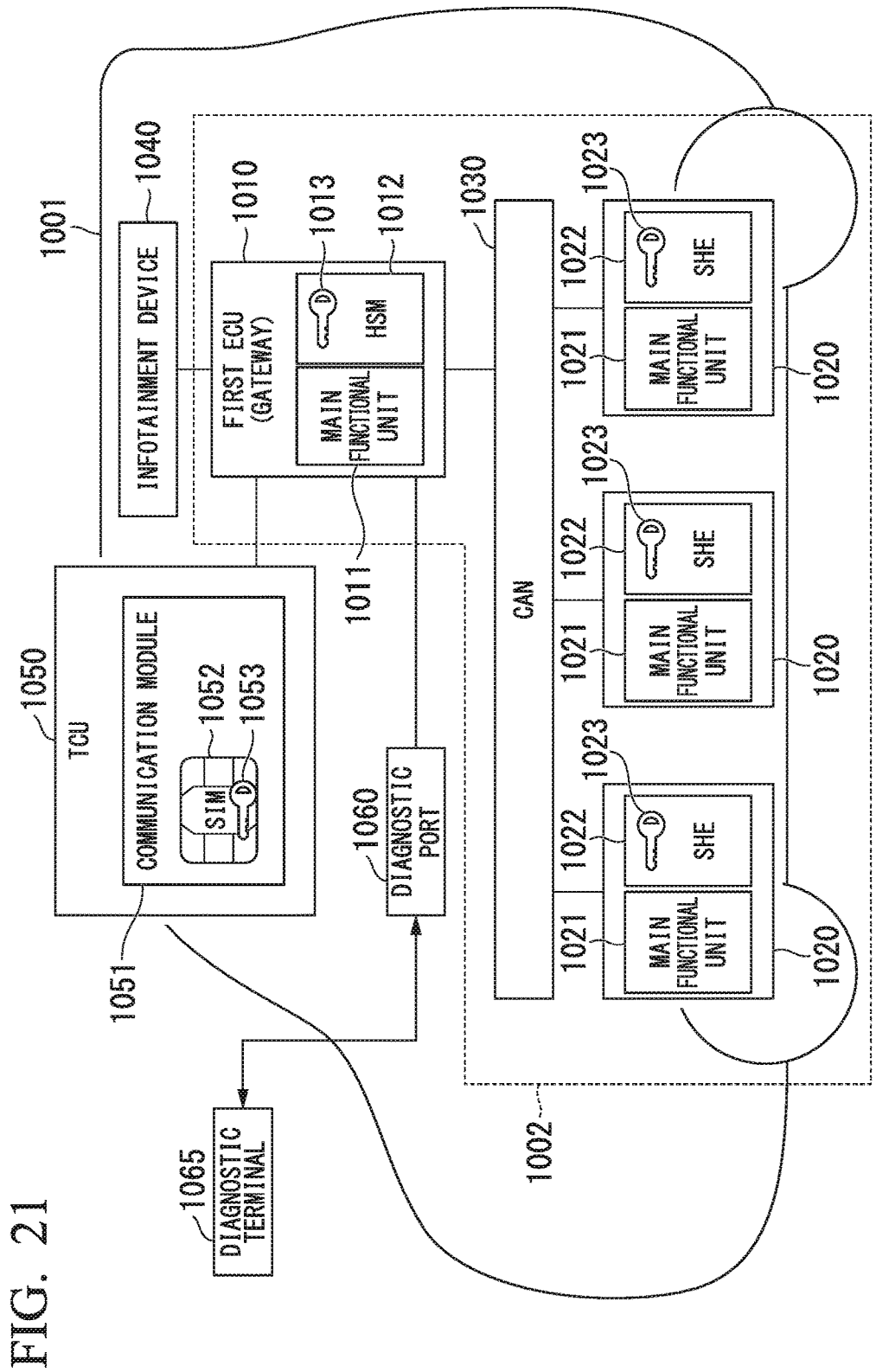
FIG. 21 shows Example 1 of an automobile 1001 according to the fourth embodiment.

FIG. 21 shows Example 1 of an automobile 1001 according to the fourth embodiment. In FIG. 21, the automobile 1001 includes a first ECU 1010 and a plurality of second ECUs 1020. The first ECU 1010 and the second ECUs 1020 are on-board computers mounted on the automobile 1001. The first ECU 1010 is an ECU having a gateway function among ECUs mounted on the computer 1001. The second ECUs 1020 are ECUs having an engine control function or the like among ECUs mounted on the automobile 1001. As the second ECUs 1020, for example, it is possible to mention an ECU having an engine control function, an ECU having a handle control function, and an ECU having a brake control function.

The first ECU 1010 and the second ECUs 1020 are connected to a CAN (Controller Area Network) 1030 installed in the automobile 1001. The CAN 1030 is a communication network. Herein, CAN is known as one type of communication network installed in vehicles.

The first ECU 1010 and the second ECUs 1020 exchange data through the CAN 1030. One second ECU 1020 may exchange data with another second ECU 1020 through CAN 1030.

As a communication network installed in a vehicle, it is possible to install a non-CAN communication network, other than CAN, in the automobile 1001 so as to achieve data exchange between the first ECU 1010 and the second ECUs 1020 as well as data exchange between the second ECUs 1020 through the non-CAN communication network. For example, it is possible to install a LIN (Local Interconnect Network) in the automobile 1001. Alternatively, it is possible to install both CAN and LIN in the automobile 1001. Moreover, it is possible to further provide the automobile 1001 with another second ECU 1020 connected to LIN.

In addition, the first ECU 1010 can be connected to CAN and LIN. Alternatively, the first ECU 1010 may exchange data with the second ECU 1020 connected to CAN through CAN while the first ECU 1010 may exchange data with the second ECU 1020 connected to LIN through LIN. Alternatively, the second ECUs 1020 may exchange data through LIN.

The automobile 1001 is equipped with a diagnostic port 1060. As the diagnostic port 1060, for example, it is possible to use an OBD port. Herein, a diagnostic terminal 1065 is connectable to the diagnostic port 1060. The first ECU 1010 exchanges data with the diagnostic terminal 1065 connected to the diagnostic port 1060 via the diagnostic port 1060.

The automobile 1001 is equipped with an infotainment device 1040. As the infotainment device 1040, for example, it is possible to mention any devices having a navigation function, a positional information service function, a multimedia reproduction function for music and moving pictures, a voice communication function, a data communication function, and an Internet-connecting function. The infotainment device 1040 is connected to the first ECU 1010. The first ECU 1010 transmits input information from the infotainment device 1040 to the second ECU 1020.

The automobile 1001 is equipped with a TCU (Tele Communication Unit) 1050. The TCU 1050 is a communication device. The TCU 1050 includes a communication module 1051. The communication module 1051 carries out wireless communications using a wireless communication network. The communication module 1051 has an SIM (Subscriber Identity Module) 1052. The SIM 1052 is an SIM that stores information to use a wireless communication network. The communication module 1051 using the SIM 1052 can be connected to the wireless communication network so as to carry out wireless communications.

The SIM 1052 has a key storage unit 1053 for storing keys. The SIM 1052 is an example of a key storage unit. As the SIM 1052, it is possible to use an eSIM (Embedded Subscriber Identity Module). Both the SIM and the eSIM are tamper resistant. The SIM and the eSIM are examples of secure elements. Secure elements should be tamper resistant. Both the SIM and the eSIM are one types of computers; hence, they may achieve desired functions according to computer programs.

The TCU 1050 is connected to the first ECU 1010. The first ECU 1010 exchanges data with the communication module 1051 of the TCU 1050.

In the configuration of FIG. 21, the first ECU 1010 is directly connected to the TCU 1050 so as to achieve data exchange between the first ECU 1010 and the TCU 1050; but this is not a restriction. For example, the TCU 1050 may be connected to the infotainment device 1040 so that the first ECU 1010 can exchange data with the communication module 1051 of the TCU 1050 via the infotainment device 1040. Instead of the diagnostic terminal 1065, the TCU 1050 may be connected to the diagnostic port 1060 so that the first ECU 1010 can exchange data with the communication module 1051 of the TCU 1050, connected to the diagnostic port 1060, via the diagnostic port 1060. Alternatively, the first ECU 1010 may include the communication module 1051 having the SIM 1052. The automobile 1001 is not necessarily equipped with the TCU 1050 when the first ECU 1010 includes the communication module 1051 having the SIM 1052.

The first ECU 1010 includes a main functional unit 1011 and an HSM (Hardware Security Module) 1012. The main functional unit 1011 executes computer programs to achieve the functionality of the first ECU 1010. The HSM 1012 has an encryption processing function.

The HSM 1012 is tamper resistant. The HSM 1012 includes a key storage unit 1013. The main functional unit 1011 utilizes the HSM 1012.

The second ECU 1020 includes a main functional unit 1021 and an SHE (Secure Hardware Extension) 1022. The main functional unit 1021 executes computer programs to achieve the functionality of the second ECU 1020. The SHE 1022 has an encryption processing function. The SHE 1022 is tamper resistant. The SHE 1022 includes a key storage unit 1023 for storing keys. The main functional unit 1021 utilizes the SHE 1022.

The automobile 1001 is equipped with an on-board computer system 1002 in which the first ECU 1010 and the second ECUs 1020 are connected to the CAN 1030. The first ECU 1010 has a gateway function to monitor communications with the inside and the outside of the on-board computer system 1002. In this connection, the on-board computer system 1002 may further include the SIM 1052 of the communication module 1051.

Example 2

Figure 22:
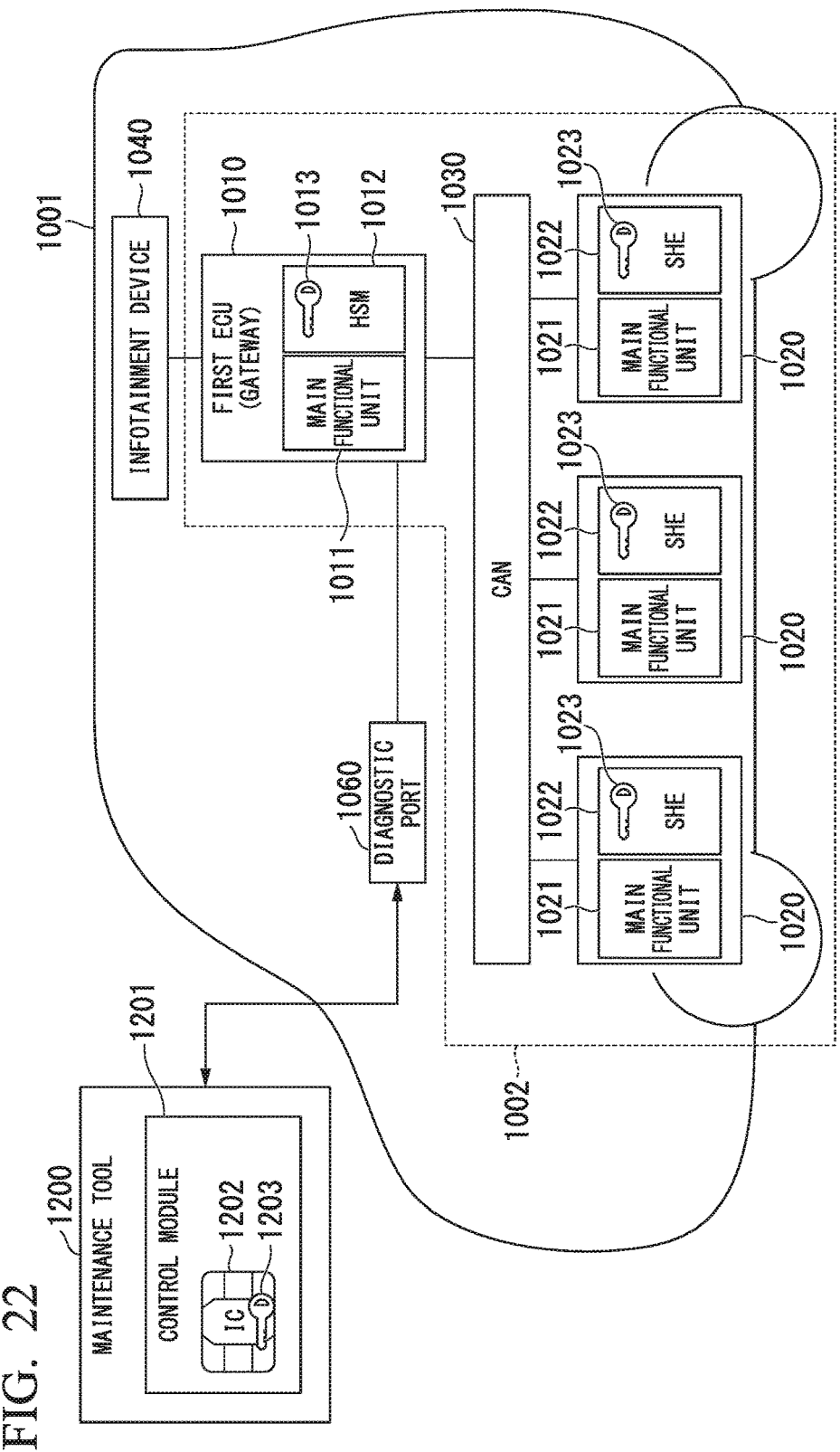
FIG. 22 shows Example 2 of the automobile 1001 according to the fourth embodiment.

FIG. 22 shows Example 2 of the automobile 1001 according to the fourth embodiment. In FIG. 22, parts corresponding to the foregoing parts shown in FIG. 21 are denoted using the same reference signs hence, their descriptions will be omitted here. In Example 2 shown in FIG. 22, a maintenance tool 1200 can be connected to the diagnostic port 1060. The first ECU 1010 exchanges data with the maintenance tool 1200, connected to the diagnostic port 1060, via the diagnostic port 1060. The maintenance tool 1200 may have a conventional function as a diagnostic terminal connected to an OBD port.

The maintenance tool 1200 includes a control module 1201. The control module 1201 includes an IC (Integrated Circuit) chip 1202. The IC chip 1202 includes a key storage unit 1203 for storing keys. The IC chip 1202 is tamper resistant. The IC chip 1202 is an example of a secure element. The IC chip 1202 is one type of computer, which achieves a desired function according to computer programs. The IC chip 1202 is an example of a key generation device.

Next, a management method according to the fourth embodiment will be described with reference to FIGS. 23 to 27.

Example G1 of Management Method

Figure 23:
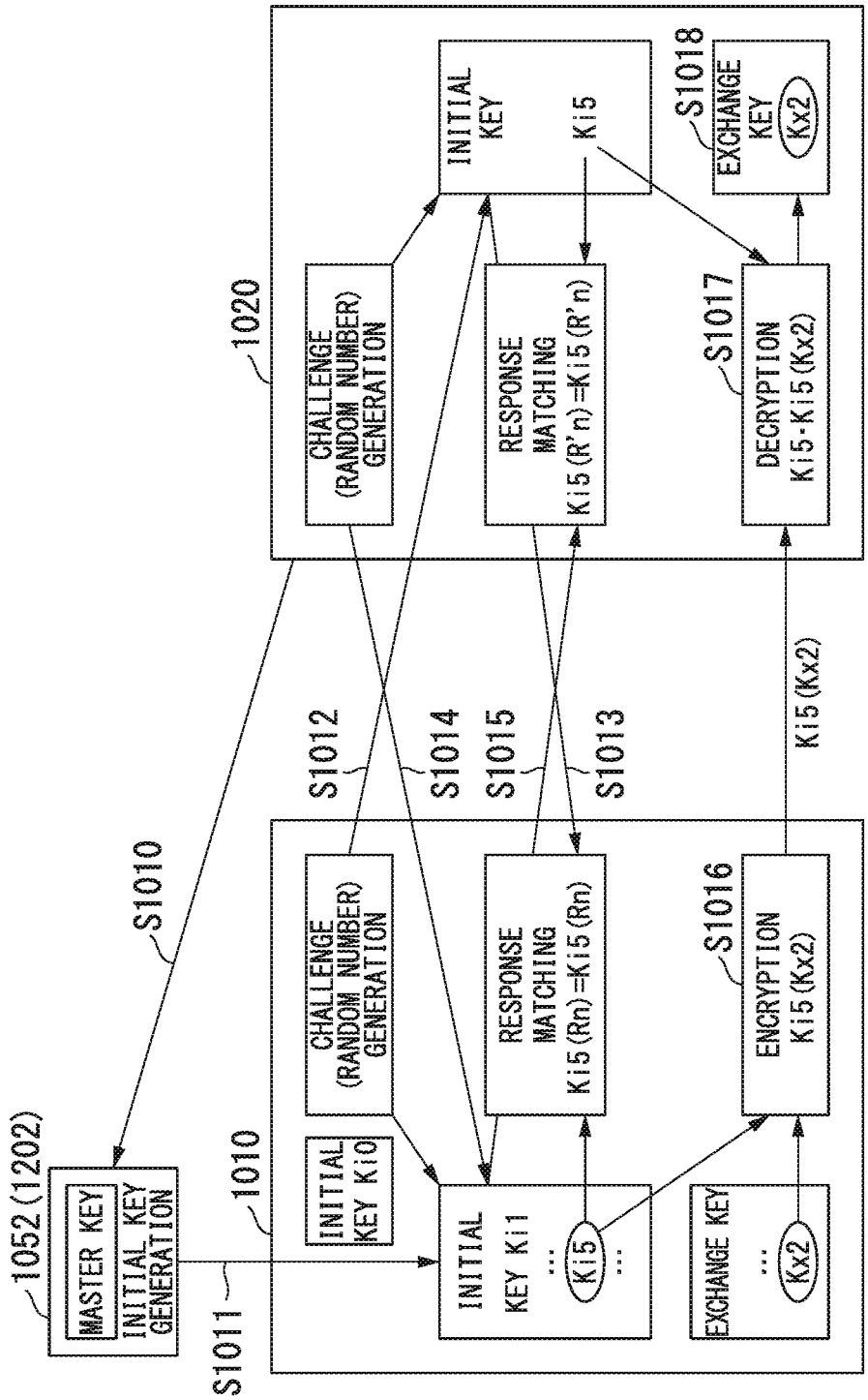
FIG. 23 is a sequence chart showing Example G1 of a management method according to the fourth embodiment.

Now, Example G1 of the management method according to the fourth embodiment will be described with reference to FIG. 23. FIG. 23 is a sequence chart showing Example G1 of the management method according to the fourth embodiment. FIG. 23 shows Example G1 of the management method of the fourth embodiment, which is applied to the automobile 1001 shown in FIG. 21 (Example 1) and FIG. 22 (Example 2) according to the fourth embodiment.

Hereinafter, Example G1 of the management method will be described with respect to an example of the automobile 1001 shown in FIG. 21 (Example 1). The following description refers to the situation that the first ECU 1010 and the second ECUs 1020 exchange data through the CAN 1030.

The following description concerning Example G1 of the management method refers a single second ECU 1020 mounted on the automobile 1001. The SHE 1022 of the second ECU 1020 stores an initial key Ki5 for the second ECU 1020 on the key storage unit 1023. The second ECU 1020 has its own identifier ECU_ID. The SIM 1052 stores a master key on the key storage unit 1053. The master key stored on the key storage unit 1053 of the SIM 1052 is identical to a master key that is used to generate the initial key Ki5 stored on the key storage unit 1023 of the second ECU 1020 together with the identifier ECU_ID of the second ECU 1020. Therefore, it is possible to generate the same key as the initial key Ki5 stored on the key storage unit 1023 of the second ECU 1020 by use of the master key stored on the key storage unit 1053 of the SIM 1052 and the identifier ECU_ID of the second ECU 1020.

The HSM 1021 of the first ECU 1010 stores an initial key Ki0 for the first ECU 1010 on the key storage unit 1013. The first ECU 1010 has its own identifier ECU_ID. The key storage unit 1053 of the SIM 1052 stores the same master key as the master key that is used to generate the initial key Ki0 stored on the key storage unit 1013 of the first ECU 1010 together with the identifier ECU_ID of the first ECU 1010. Therefore, it is possible to generate the same key as the initial key Ki0 stored on the key storage unit 1023 of the first ECU 1010 by use of the master key stored on the key storage unit 1053 of the SIM 1052 and the identifier ECU_ID of the first ECU 1010.

The first ECU 1010 supplies its own identifier ECU_ID to the SIM 1052 at a predetermined timing. For example, the predetermined timing is the timing of firstly applying power to the first ECU 1010 mounted on the automobile 1001. The identifier ECU_ID of the first ECU 1010 is transmitted from the first ECU 1010 to the communication module 1051. The communication module 1051 supplies the received identifier ECU_ID of the first ECU 1010 to the SIM 1052. The SIM 1052 obtains the master key from the key storage unit 1053 and thereby generate the initial key Ki0 for the first ECU 1010 by use of the obtained master key and the identifier ECU_ID of the first ECU 1010. The SIM 1052 generates and stores the initial key Ki0 for the first ECU 1010 on the key storage unit 1053.

In this connection, the master key used to generate an initial key for the first ECU 1010 may be identical to or different from the mater key used to generate an initial key for the second ECU 1020.

(Step S1010)

The second ECU 1020 supplies its own identifier ECU_ID to the SIM 1052 at a predetermined timing. For example, the predetermined timing is the timing of firstly applying power to the second ECU 1020 mounted on the automobile 1001. The identifier ECU_ID of the second ECU 1020 is transmitted from the second ECU 1020 to the communication module 1051 via the first ECU 1010. The communication module 1051 supplies the received identifier ECU_ID for the second ECU 1020 to the SIM 1052.

(Step S1011)

The SIM 1052 obtains the master key from the key storage unit 1053 and thereby generates the initial key Ki5 for the second ECU 1020 by use of the obtained master key and the identifier ECU_ID of the second ECU 1020. The SIM 1052 encrypts the initial key Ki5 by use of the initial key Ki0 for the first ECU 1010 stored on the key storage unit 1053 and thereby generates an encrypted initial key Kio (Ki5) representing data of the encrypted initial key Ki5. The communication module 1051 transmits to the first ECU 1010 a combination of the identifier ECU_ID of the second ECU 1020 and the encrypted initial key Ki0(Ki5) generated by the SIN 1052.

The first ECU 1010 supplies to the HSM 1012 the received combination of the encrypted initial key Ki0(Ki5) and the identifier ECU_ID of the second ECU 1020. The HSM 1012 decrypts the encrypted initial key Ki0(Ki5) by use of the initial key Ki0 for the first ECU 1010 stored on the key storage unit 1013. The decryption produces the initial key Ki5 for the second ECU 1020. The HSM 1012 stores the initial key Ki5 for the second ECU 1020 on the key storage unit 1013 in connection with the identifier ECU_ID of the second ECU 1020. Thus, both the first ECU 1010 and the second ECU 1020 share the initial key Ki5 for the second ECU 1020.

Now, initial key generating methods will be explained with respect to the following examples. Herein, initial key generating methods for the first ECU 1010 and the second ECU 1020 are determined in advance. An initial key is generated using a master key and an identifier ECU_ID for either the first ECU 1010 or the second ECU 1020.

Example G1-a1 of Initial Key Generating Method

Example G1-a1 of the initial key generating method utilizes a hash function. For example, a master key and an identifier ECU_ID can be used as input values for a hash function so as to calculate a hash value, thus using the calculated hash value as an initial key.

Example G1-a2 of Initial Key Generating Method

Example G1-a2 of the initial key generating method utilizes an exclusive-OR operation. For example, an exclusive-OR operation is carried out using a master key and an identifier ECU_ID so as to produce an operation result "master key xor identifier ECU_ID" used as an initial key. Herein, "A xor B" represents an exclusive-OR operation using A and B.

Now, the following description refers back to FIG. 23.

(Step S1012)

The HSM 1012 of the first ECU 1010 generates a random number Rn as a challenge. The first ECU 1010 sends the challenge Rn to the second ECU 1020.

(Step S1013)

The second ECU 1020 supplies the challenge Rn from the first ECU 1010 to the SHE 1022. The SHE 1022 encrypts the challenge Rn by use of the initial key Ki5 for the second ECU 1020 stored on the key storage unit 1023, thus generating encrypted data Ki5(Rn). The second ECU 1020 sends the encrypted data Ki5(Rn) as a response to the first ECU 1010. The first ECU 1010 supplies the received response Ki5(Rn) to the HSM 1012.

The HSM 1012 carries out a response matching process for the response Ki5(Rn). In the response matching process, verifies the response Ki5(Rn) by use of the initial key Ki5 for the second ECU 1020 stored on the key storage unit 1013. As the method for verifying the response Ki5(Rn), it is possible to provide the following response verifying methods, which will be described below.

Example G1-b1 of Response Verifying Method

The HSM 1012 encrypts a plurality of initial keys Ki1, . . . , Ki5, . . . by use of the challenge Rn so as to determine whether each of encryption results matches the response Ki5(Rn). The HSM 1012 successfully verifies the response Ki5(Rn) when the determination result indicates that a single encryption result matches the response Ki5 (Rn). On the other hand, the HSM 1012 fails to verify the response Ki5(Rn) when the determination result indicates that none of encryption results matches the response Ki5 (Rn) and that multiple encryption results match the response Ki5(Rn).

Example G1-b2 of Response Verifying Method

The HSM 1012 decrypts the response Ki5(Rn) by use of a plurality of initial keys Ki1, . . . , Ki5, . . . so as to determine whether each of decryption results matches the challenge Rn. The HSM 1012 successfully verifies the response Ki5 (Rn) when the determination result indicates that a single decryption result matches the challenge Rn. On the other hand, the HSM 1012 fails to verify the response Ki5(Rn) when the determination result indicates that none of decryption results matches the challenge Rn and that multiple decryption results match the challenge Rn.

The following description refers to FIG. 23 again.

Upon successfully verifying the response Ki5(Rn), the first ECU 1010 proceeds to subsequent steps. Due to failure to verify the response Ki5(Rn), the first ECU 1010 exits the procedure of FIG. 23.

In this connection, it is possible to carry out a predetermined error process due to failure to verify the response Ki5(Rn).

(Step S1014)

The SHE 1022 of the second ECU 1020 generates a random number Rn' as a challenge. The second ECU 1020 sends the challenge Rn' to the first ECU 1010.

(Step S1015)

The first ECU 1010 supplies the challenge Rn' from the second ECU 1020 to the HSM 1012. The HSM 1012 encrypts the challenge Rn' by use of the initial key Ki5 for the second ECU 1020 and thereby generates encrypted data Ki5(Rn'). The first ECU 1010 sends the encrypted data Ki5(Rn') as a response to the second ECU 1020. The second ECU 1020 supplies the received response Ki5(Rn') to the SHE 1022.

The SHE 1022 carries out a response matching process for the response Ki5(Rn'). In the response matching process, the SHE 1022 verifies the response Ki5(Rn') by use of the initial key Ki5 for the second ECU 1020 stored on the key storage unit 1023. As the method of verifying the response Ki5(Rn'), it is possible to mention some methods similar to the foregoing Examples G1-b1 and G1-b2 of response verifying methods.

Upon successfully verifying the response Ki5(Rn'), the first ECU 1010 proceeds to subsequent steps. Due to failure to verify the response Ki5(Rn'), the first ECU 1010 exits the procedure of FIG. 23. In this connection, it is possible to carry out a predetermined error process due to failure to verify the response Ki5(Rn').

(Step S1016)

The HSM 1012 of the first ECU 1010 encrypts an exchange key Kx2 stored on the key storage unit 1013 by use of the initial key Ki5 for the second ECU 1020, thus generating an encrypted exchange key Ki5(Kx2). The first ECU 1010 sends the encrypted exchange key Ki5(Kx2) to the second ECU 1020. The second ECU 1020 supplies the encrypted exchange key Ki5(Kx2) to the SHE 1022.

(Step S1017)

The SHE 1022 of the second ECU 1020 decrypts the encrypted exchange key Ki5(Kx2) by use of the initial key Ki5 for the second ECU 1020 stored on the key storage unit 1023. The decryption result yields the exchange key Kx2.

(Step S1018)

The SHE 1022 of the second ECU 1020 stores the decryption result, i.e. the exchange key Kx2, on the key storage unit 1023.

According to the foregoing Example G1 of the management method, the SIM 1052 utilizes a master key having a relatively high level of security requested in keys. The SIM 1052 generates an initial key by use of the master key and the identifier ECU_ID of the first ECU 1010. Thus, the SIM 1052 and the first ECU 1010 share the same initial key. In addition, the SIM 1052 generates an initial key by use of the master key and the identifier ECU_ID of the second ECU 1020. Thereafter, the SIM 1052 encrypts the initial key of the second ECU 1020 by use of the initial key of the first ECU 1010. The encrypted initial key of the second ECU 1020 is transmitted from the communication module 1051 to the first ECU 1010. The first ECU 1010 decrypts the encrypted initial key of the second ECU 1020 by use of its initial key. Thus, both the first ECU 1010 and the second ECU 1020 share the same initial key. The first ECU 1010 stores the initial key of each second ECU 1020 on the key storage unit 1013 with respect to each second ECU 1020 mounted on the automobile 1001. For example, the initial key shared by the first ECU 1010 and the second ECU 1020 is used for mutual authentication between the first ECU 1010 and the second ECU 1020 as well as encryption processing in exchanging data such as exchange keys.

When the foregoing Example G1 of the management method is applied to the automobile 1001 shown in FIG. 22 (Example 2), the maintenance tool 1200 is substituted for the TCU 1050 shown in FIG. 21. Specifically, the control module 1201 of the maintenance tool 1200, instead of the communication module 1051 of the TCU 1050, transmits or receives data with the first ECU 1010 by means of the diagnostic port 1060. In addition, the IC chip 1202 of the control module 1201 of the maintenance tool 1200 and the key storage unit 1203 of the IC chip 1202 are substituted for the SIM 1052 of the communication module 1051 of the TCU 1050 and the key storage unit 1053 of the SIM 1052 shown in FIG. 21.

According to the foregoing Example G1 of the management method shown in FIG. 23, mutual authentication is carried out between the first ECU 1010 and the second ECU 1020. Thus, it is possible to improve an accuracy of authentication. In the first, second, and third embodiments, similar to Example G1 of the management method shown in FIG. 3, it is possible to carry out mutual authentication between two parties that need to authenticate each other.

Example G2 of Management Method

Next, Example G2 of the management method according to the fourth embodiment will be described with reference to FIGS. 24 to 27. Herein, Example G2 of the management method employs a multilayer common key cryptography. Example G2 of the management method according to the fourth embodiment shown in FIGS. 24 to 27 is applied to the automobile 1001 of the fourth embodiment shown in FIG. 21 (Example 1) and FIG. 22 (Example 2).

The key management method using the multilayer common key cryptography will be described with reference to FIGS. 24 and 25.

Now, a first stage of the key management method using the multilayer common key cryptography will be described with reference to FIG. 24. FIG. 24 is a sequence chart showing the first stage of the key management method using the multiplayer common key cryptography.

Figure 24:
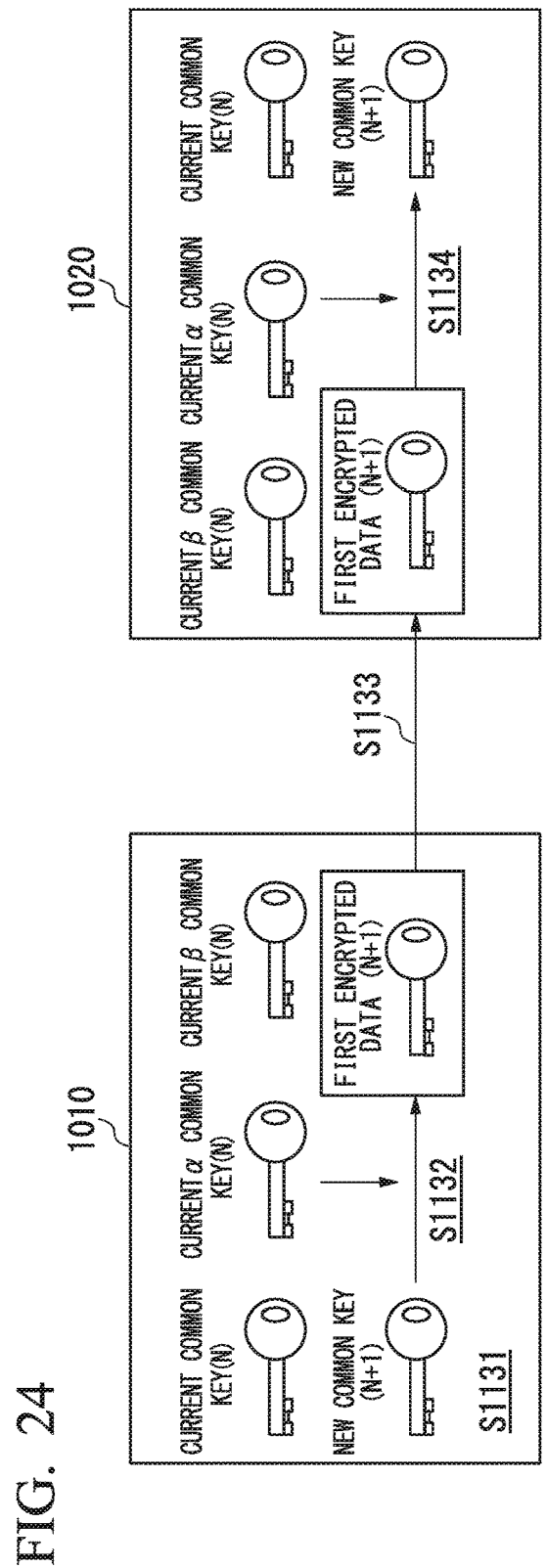
FIG. 24 is a sequence diagram showing a first phase of a key management method in a multilayer common key cryptosystem as Example G2 of the management method according to the fourth embodiment.

In FIG. 24, it is assumed that both the first ECU 1010 and the second ECU 1020 have a current common key (N), i.e. an Nth common key among common keys shared in advance.

In addition, both the first ECU 1010 and the second ECU 1020 have a current α-common key (N), i.e. an Nth common key among α series of common keys shared in advance. Moreover, both the first ECU 1010 and the second ECU 1020 have a current β-common key (N), i.e. an Nth common key among β series of common keys shared in advance.

(Step S1131)

The first ECU 1010 generates a new common key (N+1), i.e. a new "N+1" common key. The first ECU 1010 rewrites the current common key (N) with the new common key (N+1) on a register holding the current common key (N). For example, the first ECU 1010 may change its common key from the current common key (N) to the new common key (N+1) when the number of times for using the current common key (N) reaches a predetermined number of times.

(Step S1132)

In the first ECU 1010, the HSM 1012 encrypts the new common key (N+1) using the current α-common key (N).

(Step S1133)

The first ECU 1010 sends the encryption result of the new common key (N+1), i.e. first encrypted data (N+1), to the second ECU 1020.

(Step S1134)

In the second ECU 1020, the SHE 1022 decrypts the first encrypted data (N+1) from the first ECU 1010 by use of the current α-common key (N). The second ECU 1020 rewrites the current common key (N) with the decryption result of the first encrypted data (N+1) on a register holding the current common key (N). Thus, it is possible to update the value of a register of the second ECU 1020 from the current common key (N) to the new common key (N+1).

Thus, it is possible to update the common key, applied to each of the first ECU 1010 and the second. ECU 1020, from the current common key (N) to the new common key (N+1).

Next, a second stage of the key management method using the multilayer common key cryptography will be described with reference to FIG. 25. FIG. 25 is a sequence chart showing the second stage of the key management method using the multilayer common key cryptography.

Figure 25:
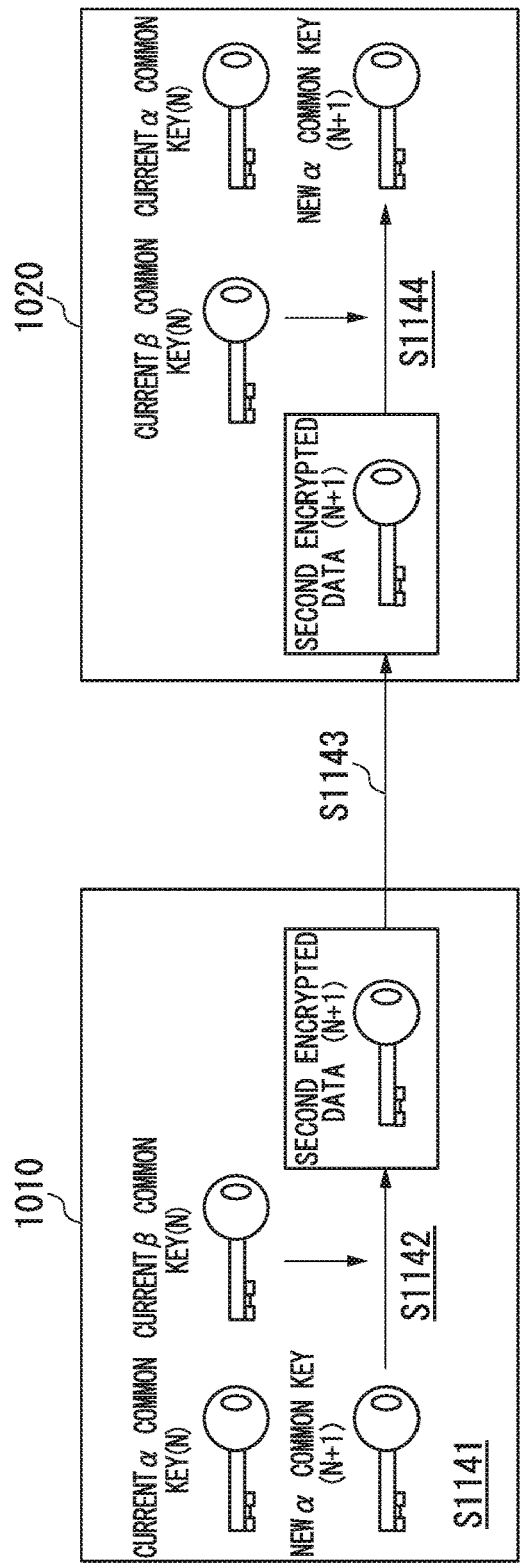
FIG. 25 is a sequence chart showing a second phase of the key management method in the multilayer common key cryptosystem as Example G2 of the management method according to the fourth embodiment.

In FIG. 25, the first ECU 1010 and the second ECU 1020 have the current α-common key (N) and the current β-common key (N) shared in advance.

(Step S1141)

The first ECU 1010 generates a new α-common key (N+1), i.e. an "N+1" common key among α series of common keys. The first ECU 1010 rewrites the current α-common key (N) with the new α-common key (N+1) on the register storing the current α-common key (N). For example, the first ECU 1010 may change its α-series common key from the current α-common key (N) to the new α-common key (N+1) when the number of times in using the current α-common key reaches a predetermined number of times.

(Step S1142)

In the first ECU 1010, the HSM 1012 encrypts the new α-common key (N+1) by use of the current β-common key (N).

(Step S1143)

The first ECU 1010 sends the encryption result of the new α-common key (N±1), i.e. second encrypted data (N+1), to the second ECU 1020.

(Step S1144)

In the second ECU 1020, the SHE 1022 decrypts the second encrypted data (N+1) from the first ECU 1010 by use of the current β-common key (N). The second ECU 1020 rewrites the current α-common key (N) with the decryption result of the second encrypted data (N+1) on the register storing the current α-common key (N). Thus, it is possible to update the current α-common key (N) with the new α-common key (N+1) on the register of the second ECU 1020.

Thus, it is possible to update an α-series common key from the current α-common key (N) to the new α-common key (N+1) on the first ECU 1010 and the second ECU 1020.

According to the key management method using the multilayer common key cryptography shown in FIGS. 24 and 25, it is possible to achiever high-speed performance in the common key cryptography, and it is possible to repeatedly use the same routine of processing. The present embodiment is able to simplify program codes by repeatedly using the same routine of processing, and therefore the present embodiment is preferable in terms of the CPU performance and the memory capacity with limited computer resources, e.g. the first ECU 1010 and the second ECU 1020.

Figure 26:
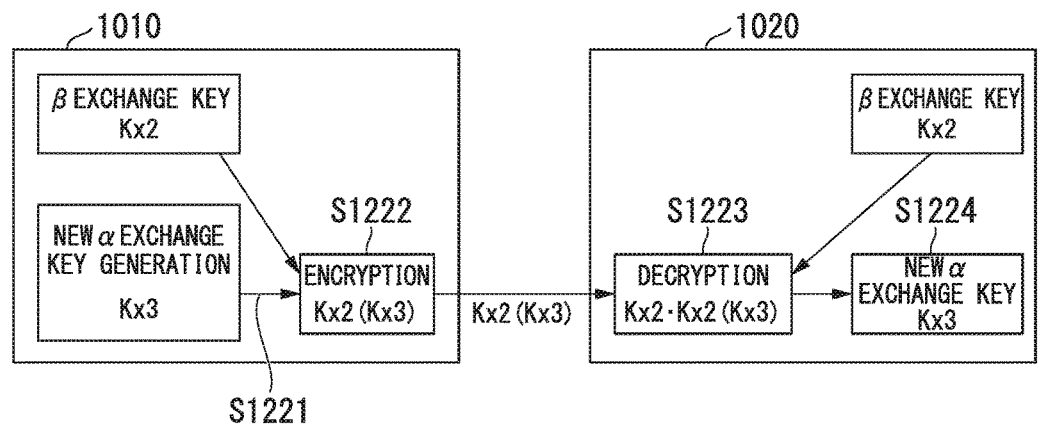
FIG. 26 is a sequence chart showing Application G2-1 of the key management system in the multilayer common key cryptosystem according to the fourth embodiment.
Figure 27:
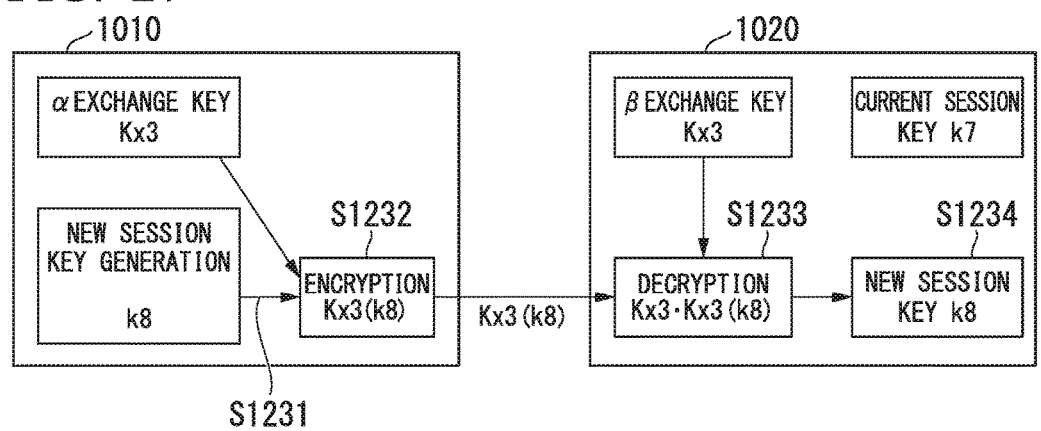
FIG. 27 is a sequence chart showing Application G2-2 of the key management method in the multiplayer common key cryptosystem according to the fourth embodiment.

Applications of the key management method using the multilayer common key cryptography will be described with reference to FIGS. 26 and 27. The example of FIG. 26 is applied to exchange keys. The example of FIG. 27 is applied to session keys. For example, exchange keys are used to update keys such as session keys. For example, session keys are used to provide security for communications in message authentication using message authentication codes (MAC) or the like.

(Application G2-1 of Key Management Method Using Multilayer Common Key Cryptography)

Now, Application G2-1 of the key management method using the multilayer common key cryptography will be described with reference to FIG. 26.

FIG. 26 is a sequence chart showing Application G2-1 of the key management method using the multilayer common key cryptography. The following description refers to a single second ECU 1020 subject to updating of exchange keys. In FIG. 26, the first ECU 1010 and the second ECU 1020 share a β-exchange key Kx2, i.e. a β-series exchange key shared in advance.

(Step S1221)

The HSM 1012 of the first ECU 1010 generates a new α-exchange key Kx3, i.e. a new exchange key among α-series exchange keys. The HSM 1012 of the first ECU 1010 stores the new α-exchange key Kx3 as the latest α-series exchange key on the key storage unit 1013.

(Step S1222)

The HSM 1012 of the first ECU 1010 encrypts the new α-exchange key Kx3 by use of the β-exchange key Kx2 stored on the key storage unit 1013, thus generating an encrypted exchange key Kx2(Kx3). The first ECU 1010 sends the encrypted exchange key Kx2(Kx3) to the second ECU 1020. The second ECU 1020 supplies the encrypted exchange key Kx2(Kx3) to the SHE 1022.

(Step S1223)

The SHE 1022 of the second ECU 1020 decrypts the encrypted exchange key Kx2(Kx3) by use of the β-exchange key Kx2 stored on the key storage unit 1023. The decryption result yields the new α-exchange key Kx3.

(Step S1224)

The SHE 1022 of the second ECU 1020 stores the decryption result, i.e. the new α-exchange key Kx3, as the latest α-series exchange key on the key storage unit 1023. Thus, it is possible to update the α-series exchange key with the new α-exchange key Kx3.

(Application G2-2 of Key Management Method Using Multilayer Common Key Cryptography)

Next, Application G2-2 of the key management method using the multilayer common key cryptography will be described with reference to FIG. 27.

FIG. 27 is a sequence chart showing Application G2-2 of the key management method using the multilayer common key cryptography. The following description refers to a single second ECU 1020 subject to updating of session keys. In FIG. 27, the first ECU 1010 and the second ECU 1020 share the α-exchange key Kx3 as a α-series exchange key shared in advance.

(Step S1231)

The HSM 1012 of the first ECU 1010 generates a new session key k8.

(Step S1232)

The HSM 1012 of the first ECU 1010 encrpts the new session key k8 by use of the α-exchange key Kx3 stored on the key storage unit 1013, thus generating an encrypted session key Kx3(*k*8). The first ECU 1010 sends the encrypted session key Kx3(*k*8) to the second ECU 1020. The second ECU 1020 supplies the encrypted session key Kx3 (*k*8) to the SHE 1022.

(Step S1233)

The SHE 1022 of the second ECU 1020 decrypts the encrypted session key Kx3(*k*8) by use of the α-exchange key stored on the key storage unit 1023. The decryption result yields the new session key k8.

(Step S1234)

The SHE 1022 of the second ECU 1020 stores the decryption result, i.e. the new session key k8, as the latest session key on the key storage unit 1023. Thus, it is possible to update the session key with the new session key k8 on the second ECU 1020.

According to the foregoing Example G2 of the key management method, it is possible to achieve an effect of improving security for common keys. Upon repeatedly using common keys such as exchange keys, for example, a prescribed analytical technique such as leaked electromagnetic-wave analysis may incur the possibility of leaking common keys. As a countermeasure, in the foregoing Example G2 of the management method, it is possible to update common keys according to the key management method using the multilayer common key cryptography shown in FIGS. 24 and 25.

Upon repeatedly using the current α-common key (N) in the first stage of the key management method using the multilayer common key cryptography shown in FIG. 24, an analytical technique such as leaked electromagnetic-wave analysis may incur the possibility of leaking the current α-common key (N). As a countermeasure, in the foregoing Example G2 of the management method, it is possible to update α-series common keys in the second stage of the key management method using the multilayer common key cryptography.

In this connection, Example G2 of the management method according to the fourth embodiment may be applied to the first, second, and third embodiments. In other words, it is possible for the first, second, and third embodiments to employ the key management method using the multilayer common key cryptography according to the fourth embodiment.

In the foregoing embodiment, for example, SIM or eSIM can be used as secure elements. Herein, eSIM is one type of SIM that is tamper resistant. In addition, it is possible to use a tamper-resistant IC chip as a secure element. Alternatively, it is possible to use a tamper-resistant encryption processing chip as a secure element.

As tamper-resistant encryption processing chips, for example, various encryption processing chips called HSM, TPM (Trusted Platform Module), and SHE have been known.

It is possible to store on computer-readable storage media computer programs executable with the management device 10, the communication module 1051, the SIM 1052, the first ECU 1010, the HSM 1012, the second ECU 1020, the SHE 1022, the control module 1201, or the IC chip 1202, and therefore computer programs stored on storage media can be loaded into and executed by computer systems. Herein, the term "computer system" may embrace OS and hardware such as peripheral devices.

In addition, the term "computer-readable storage media" refer to flexible disks, magneto-optic disks, ROM, rewritable nonvolatile memory such as flash memory, portable media such as DVD (Digital Versatile Disk), storage devices such as hard disks installed in computer systems.

Moreover, the term "computer-readable storage media" refer to any measures for holding programs in a certain period of time such as volatile memory (e.g. DRAM (Dynamic Random Access Memory)) installed in computer systems acting as servers and clients to which programs are transmitted through telephone lines, communication lines, and networks such as the Internet.

The foregoing programs may be transmitted from computer systems having storage devices storing programs to other computer systems by means of transmission media or transmission waves in transmission media. Herein, the term "transmission media" for transmitting programs refer to any media having information transmitting functions such as telephone lines, communication lines, and networks (or communication networks) such as the Internet.

In addition, the foregoing programs may achieve part of the foregoing functions.

Moreover, the foregoing programs may be differential files (or differential programs) that can achieve the foregoing functions when combined with pre-installed programs of computer systems.

REFERENCE SIGNS LIST

1, 1001 . . . automobile
2 . . . wireless communication network
3 . . . wireless communication line
4 . . . communication line
10 . . . management device
11 . . . wireless communication part
12 . . . CAN interface
20 . . . eSIM
21 . . . key generation part
22, 1013, 1053, 1203 . . . key storage unit
23 . . . verification part
24 . . . encryption processor
25 . . . initially-delivered key storage unit
26 . . . common-carrier key storage unit
27 . . . fixed-value encryption list storing part
31 . . . ECU-management key Kmn storing part
32 . . . ECU-management key Km(n−1) storing part
33 . . . ECU-key kn storing part
40 . . . controller on-board network
50 . . . ECU
51 . . . controller
52 . . . CAN interface
53 . . . encryption processor
54 . . . key storage unit
55 . . . initially-delivered key storage unit
56 . . . fixed-value storage unit
57 . . . verification part
60 . . . management server
61 . . . communication part
62 . . . common-carrier key storage unit
63 . . . management part
64 . . . management data storage unit
1010 . . . first ECU
1020 . . . second ECU
1022 . . . SHE
1030 . . . CAN
1050 . . . TCU
1051 . . . communication module
1052 . . . SIM
1060 . . . diagnostic port
1200 . . . maintenance tool
1201 . . . control chip
1202 . . . IC chip

The invention claimed is:

1. A management device configured to manage an on-board computer mounted on a vehicle, the management device comprising:
a communication part configured to communicate with the on-board computer mounted on the vehicle;
an encryption processor configured to encrypt a management key used to update a key used for authentication of the on-board computer and to thereby generate an encrypted management key;
a key generation part configured to generate the management key in connection with the key;
a key storage unit configured to store the management key in connection with the key;
an initially-delivered key storage unit configured to store a plurality of initially-delivered keys corresponding to candidates of initially-delivered keys held by the on-board computer; and
a verification part configured to verify encrypted data from the on-board computer via the communication part by use of an initially-delivered key among the plurality of initially-delivered keys stored on the initially-delivered key storage unit,
wherein the communication part transmits the encrypted management key to the on-board computer, and
wherein the encryption processor encrypts the management key by use of the initially-delivered key successfully verified by the verification part.

2. The management device according to claim 1, further comprising a fixed-value encryption list storing part configured to store a list describing combinations of encrypted fixed values, which are produced by encrypting fixed values using the plurality of initially-delivered keys stored on the initially-delivered key storage unit, and the plurality of initially-delivered keys used for encryption of the encrypted fixed values,
wherein the verification part compares the encrypted fixed value from the on-board computer via the communication part with each of the encrypted fixed values described on the list so as to use the initially-delivered key included in each combination having matched the encrypted fixed value among combinations on the list for verification of the encrypted data.

3. The management device according to claim 1, wherein the verification part verifies the encrypted data received from the on-board computer by:
transmitting a challenge to the on-board computer mounted on the vehicle,
receiving a response to the challenge which is generated by the on-board computer by encrypting the challenge using an initially-delivered key among the plurality of initially-delivered keys held by the on-board computer,
carrying out a response matching process to verify the response using the initially-delivered key among the plurality of initially-delivered keys stored on the initially-delivered key storage unit, and thereby
encrypting the management key using the initially-delivered key used for verifying the response in success.

4. The management device according to claim 1,
wherein the encryption processor encrypts the management key by use of the initially-delivered key identical to the initially-delivered key held by the on-board computer mounted on the vehicle among the initially-delivered keys stored on the initially-delivered key storage unit, thus encrypting the key using the management key.

5. The management device according to claim 4, wherein the key generation part repeatedly generates the management key,
wherein the key storage unit stores a latest management key and its preceding management key preceding the latest management key among management keys, and
wherein the encryption processor encrypts the latest management key by use of the preceding management key.

6. The management device according to claim 1, wherein the encryption processor encrypts an abandonment key,
wherein the communication part transmits an encrypted key, which is generated by encrypting the abandonment key, to the on-board computer having received an abandonment notification among the on-board computers mounted on the vehicle.

7. The management device according to claim 1, further comprising a wireless communication part configured to communicate with a management server, wherein the encryption processor encrypts the management key stored on the key storage unit by use of a key shared with the management server, and
wherein the wireless communication part transmits the encrypted management key to the management server.

8. A management method adapted to a management device configured to manage an on-board computer mounted on a vehicle, the management method comprising:
communicating with an on-board computer mounted on the vehicle;
generating an encrypted management key by encrypting a management key used to update a key used for authentication of the on-board computer;
generating the management key in connection with the key;
storing the management key in connection with the key,
storing a plurality of initially-delivered keys corresponding to candidates of initially-delivered keys held by the on-board computer, and
verifying encrypted data received from the on-board computer by use of an initially-delivered key among the plurality of initially-delivered keys,
wherein the encrypted management key is transmitted to the on-board computer, and
wherein the management key is encrypted using the initially-delivered key succeeded in verification.

9. A non-transitory computer-readable storage medium having stored a program causing a computer mounted to implement the management method according to claim 8.

10. The management method according to claim 8, further comprising:
transmitting a challenge to the on-board computer,
receiving a response to the challenge which is generated by the on-board computer by encrypting the challenge using an initially-delivered key among the plurality of initially-delivered keys held by the on-board computer,
carrying out a response matching process to verify the response using the initially-delivered key among the plurality of initially-delivered keys stored on the initially-delivered key storing step, and thereby
encrypting the management key using the initially-delivered key used for verifying the response in success.

* * * * *